(12) United States Patent
Takato

(10) Patent No.: US 10,996,455 B2
(45) Date of Patent: May 4, 2021

(54) OBJECTIVE OPTICAL SYSTEM, IMAGE PICKUP APPARATUS, AND ENDOSCOPE

(71) Applicant: OLYMPUS CORPORATION, Hachioji (JP)

(72) Inventor: Hideyasu Takato, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 88 days.

(21) Appl. No.: 16/586,905

(22) Filed: Sep. 28, 2019

(65) Prior Publication Data

US 2020/0026060 A1    Jan. 23, 2020

Related U.S. Application Data

(63) Continuation of application No. PCT/JP2018/015169, filed on Apr. 11, 2018.

(30) Foreign Application Priority Data

May 1, 2017 (JP) .............................. JP2017-091146

(51) Int. Cl.
    *G02B 23/24* (2006.01)
    *G02B 15/14* (2006.01)

(52) U.S. Cl.
    CPC ... *G02B 23/243* (2013.01); *G02B 15/144105* (2019.08)

(58) Field of Classification Search
    CPC .............. G02B 23/243; G02B 15/144105
    USPC ...................................................... 359/781
    See application file for complete search history.

(56) References Cited

U.S. PATENT DOCUMENTS

| | | |
|---|---|---|
| 6,353,504 B1 | 3/2002 | Yamamoto |
| 8,164,836 B2 | 4/2012 | Uzawa et al. |
| 8,922,916 B2 | 12/2014 | Yamamoto et al. |
| 8,947,785 B2 | 2/2015 | Yamamoto |
| 9,019,621 B2 | 4/2015 | Takada et al. |
| 9,645,382 B2 | 5/2017 | Yamamoto |

(Continued)

FOREIGN PATENT DOCUMENTS

| | | |
|---|---|---|
| JP | 2001091832 A | 4/2001 |
| JP | 3722458 B2 | 11/2005 |
| JP | 2009300489 A | 12/2009 |

(Continued)

OTHER PUBLICATIONS

International Search Report (ISR) dated Jul. 17, 2018 issued in International Application No. PCT/JP2018/015169.

(Continued)

*Primary Examiner* — James R Greece
(74) *Attorney, Agent, or Firm* — Holtz, Holtz & Volek PC

(57) ABSTRACT

An objective optical system consists of, in order from an object side, a first lens group having a negative refractive power, which is stationary all the time, a second lens group having a positive refractive power, a third lens group having a negative refractive power, and a fourth lens group having a positive refractive power, which is stationary all the time. At a time of focusing from an object point at a long distance to an object point at a short distance, the second lens group moves toward the object side and the third lens group moves toward an image side. The following conditional expressions (1), (5), and (7) are satisfied:

$2 < fG2/f < 8$    (1)

$0.2 < (t34f - t34n)/f < 0.5$    (5)

$-8 < fG1/f < -2$    (7).

19 Claims, 11 Drawing Sheets

(56) References Cited

U.S. PATENT DOCUMENTS

2015/0022907 A1* 1/2015 Yamamoto ........... G02B 23/243
359/749

FOREIGN PATENT DOCUMENTS

| | | |
|---|---|---|
| JP | 4723628 B2 | 7/2011 |
| JP | 4834799 B2 | 12/2011 |
| JP | 2013104956 A | 5/2013 |
| JP | 5567224 B2 | 8/2014 |
| JP | 5567225 B2 | 8/2014 |
| JP | 2015022161 A | 2/2015 |
| WO | 2013069263 A1 | 5/2013 |
| WO | 2013069266 A1 | 5/2013 |

OTHER PUBLICATIONS

Japanese Office Action dated Dec. 5, 2018 issued in counterpart Japanese Patent Application No. 2018-555778.
Written Opinion dated Jul. 17, 2018 issued in International Application No. PCT/JP2018/015169.
International Preliminary Report on Patentability (IPRP) dated Nov. 14, 2019 (and English translation thereof), issued in International Application No. PCT/JP2018/015169.

* cited by examiner

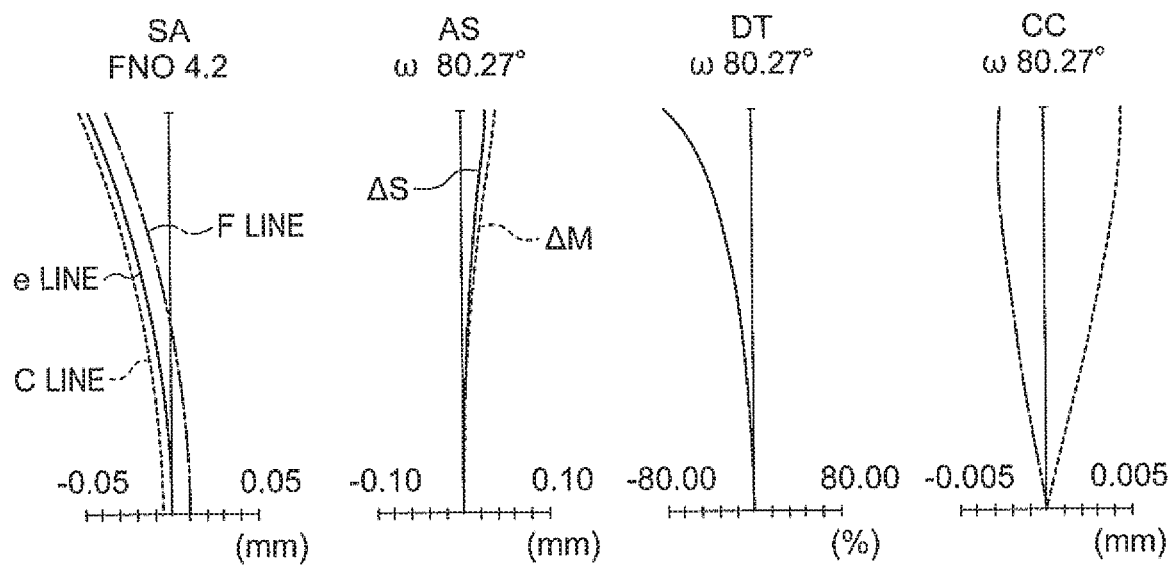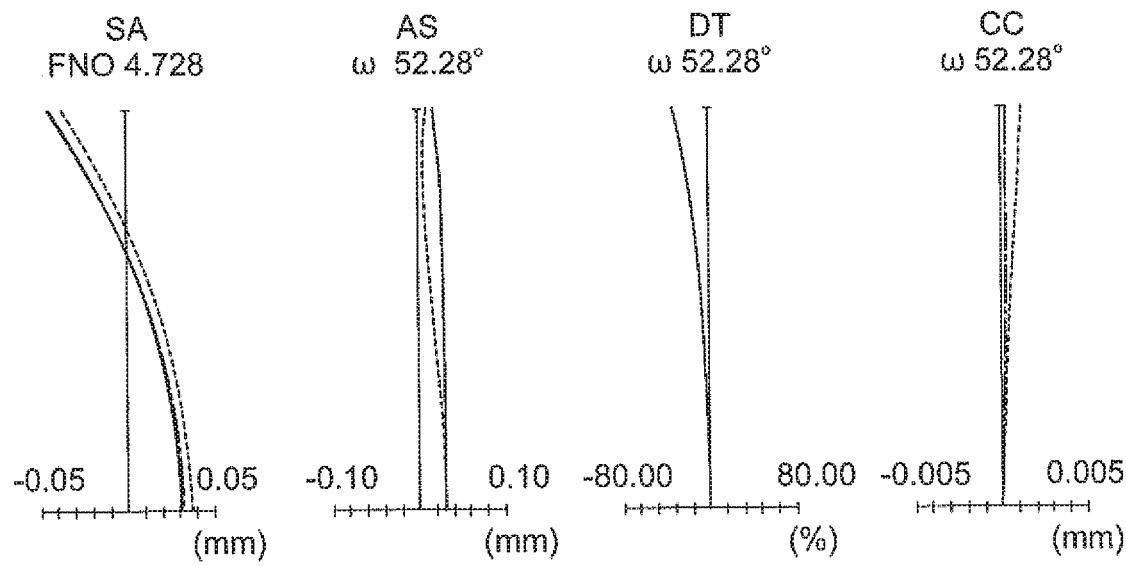

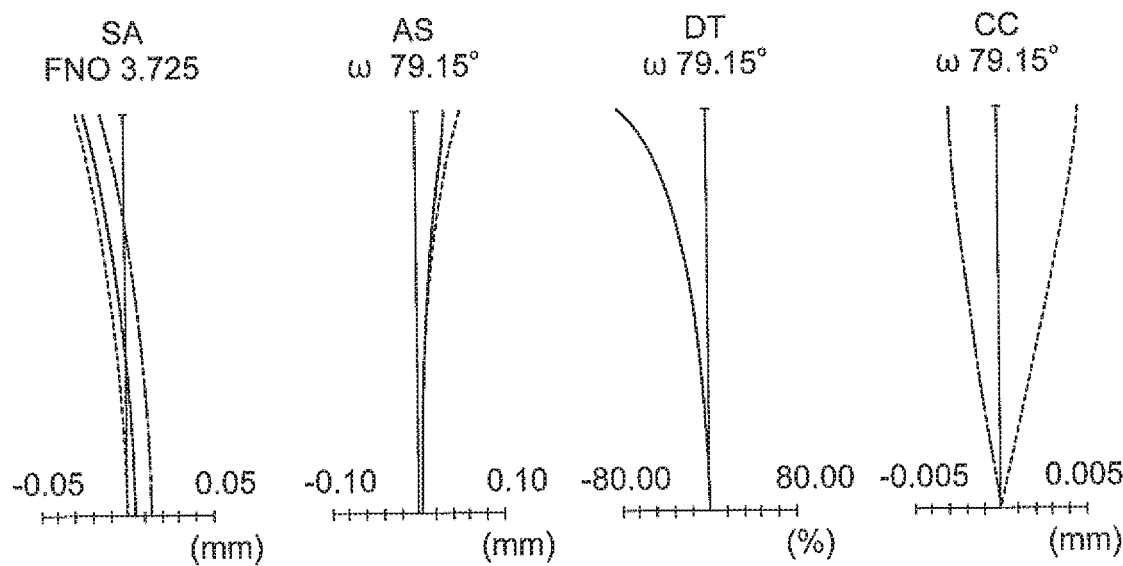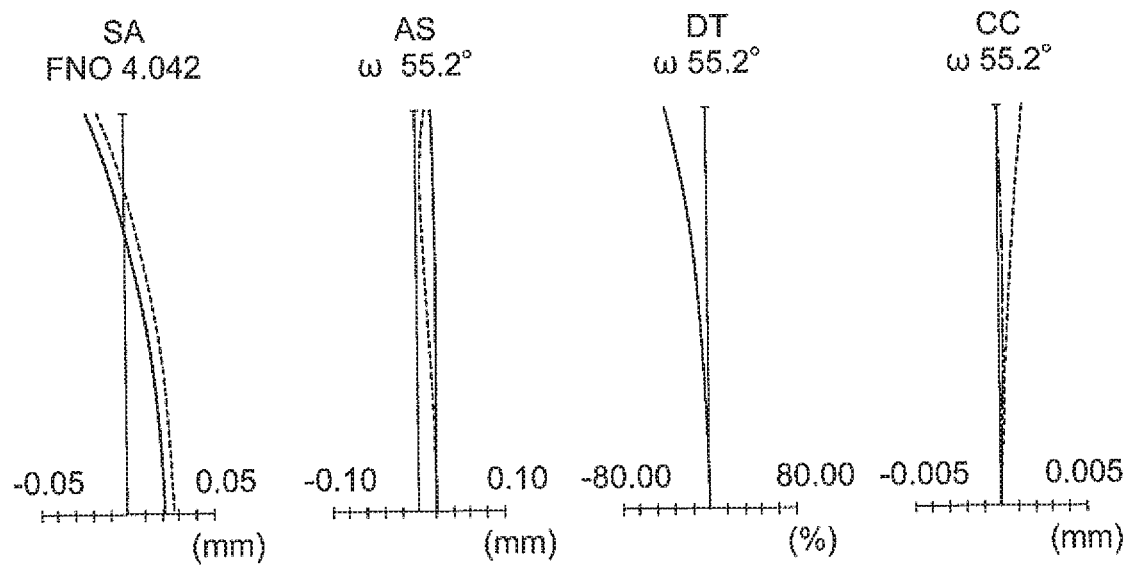

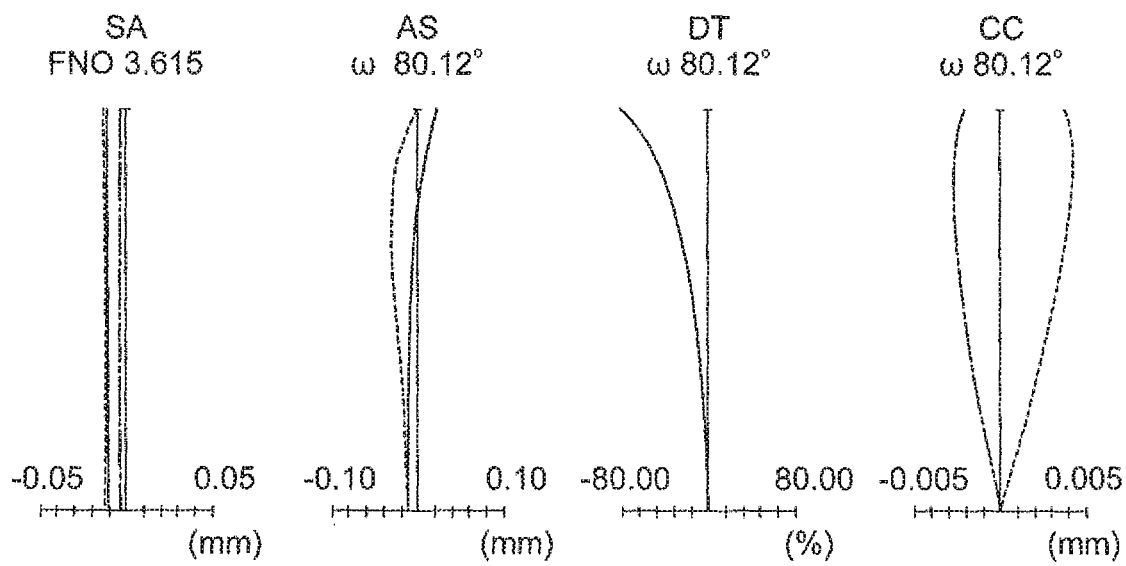
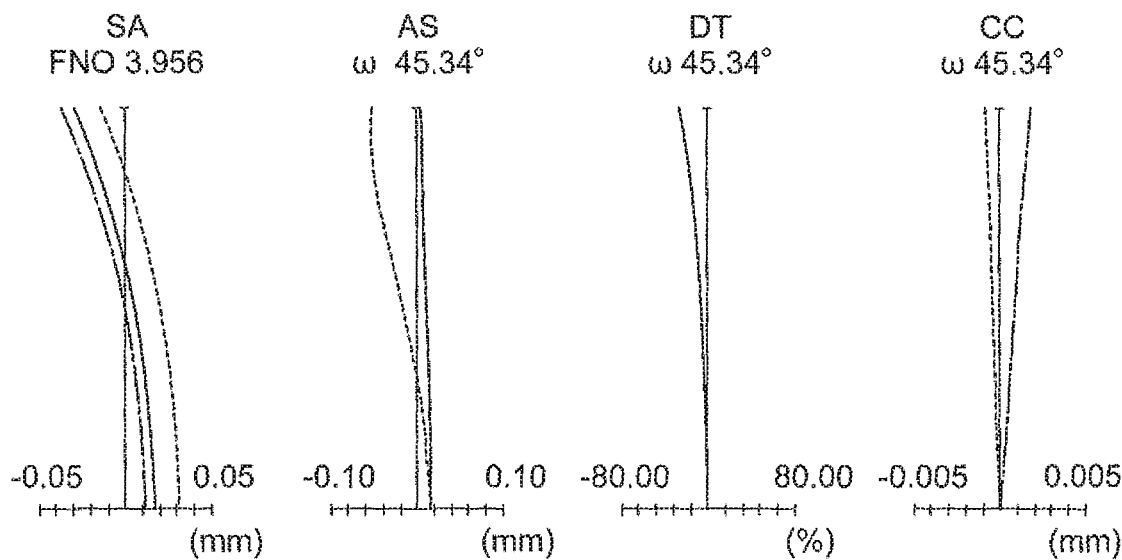

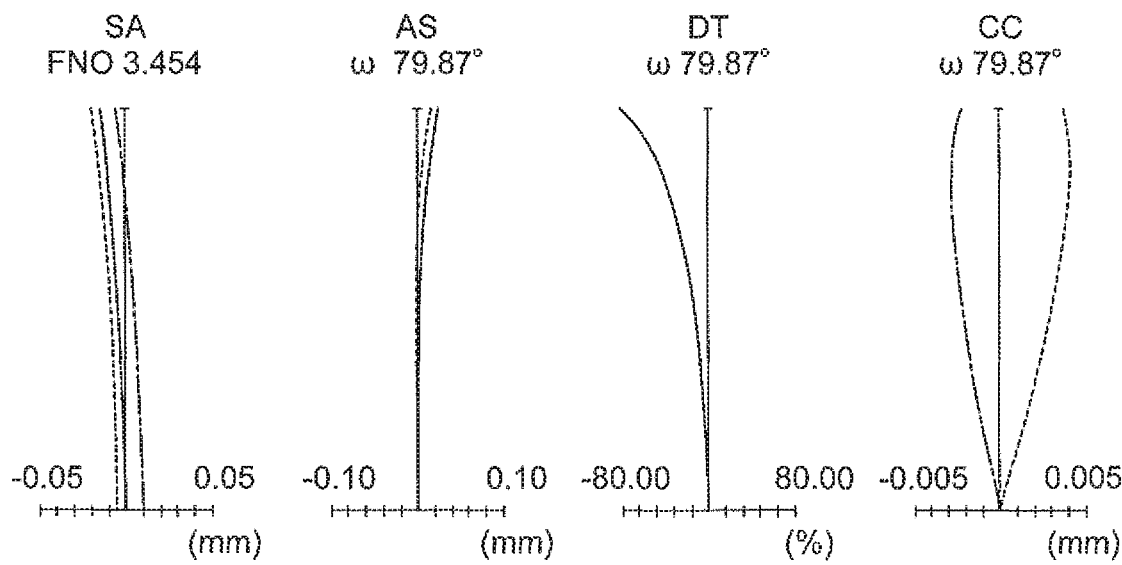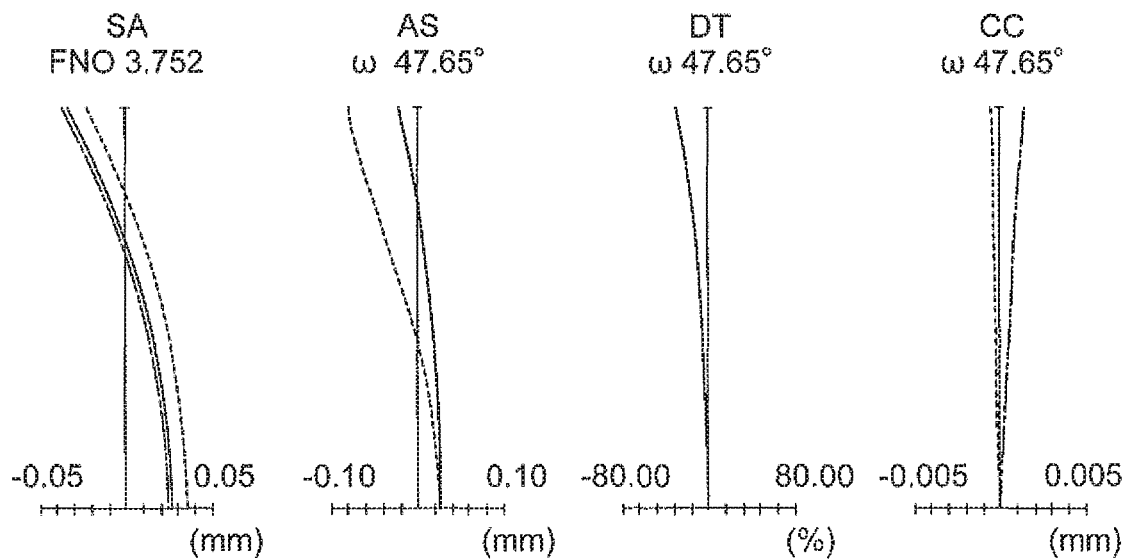

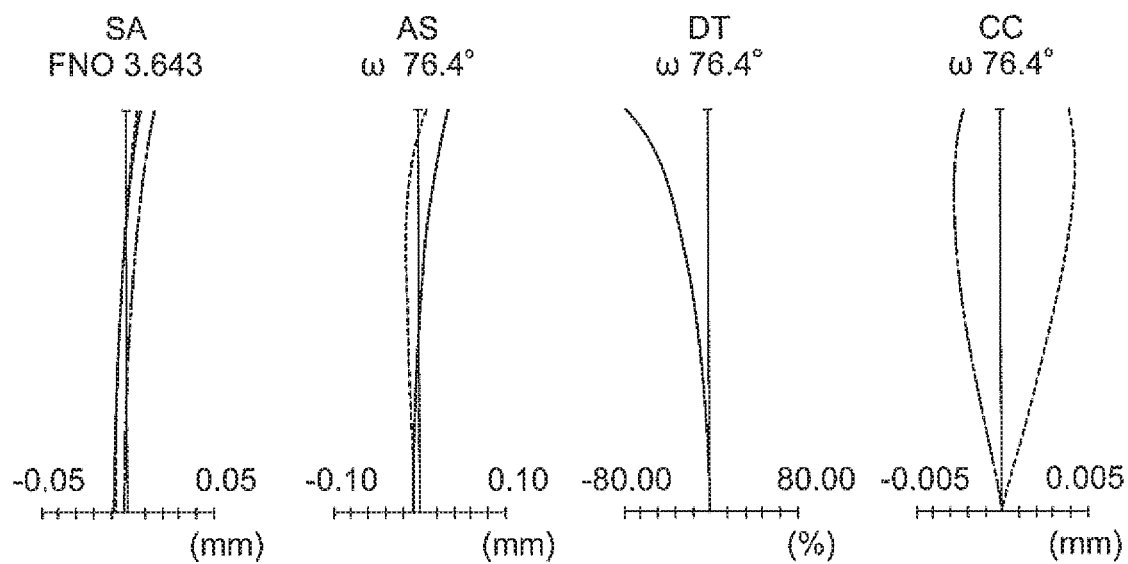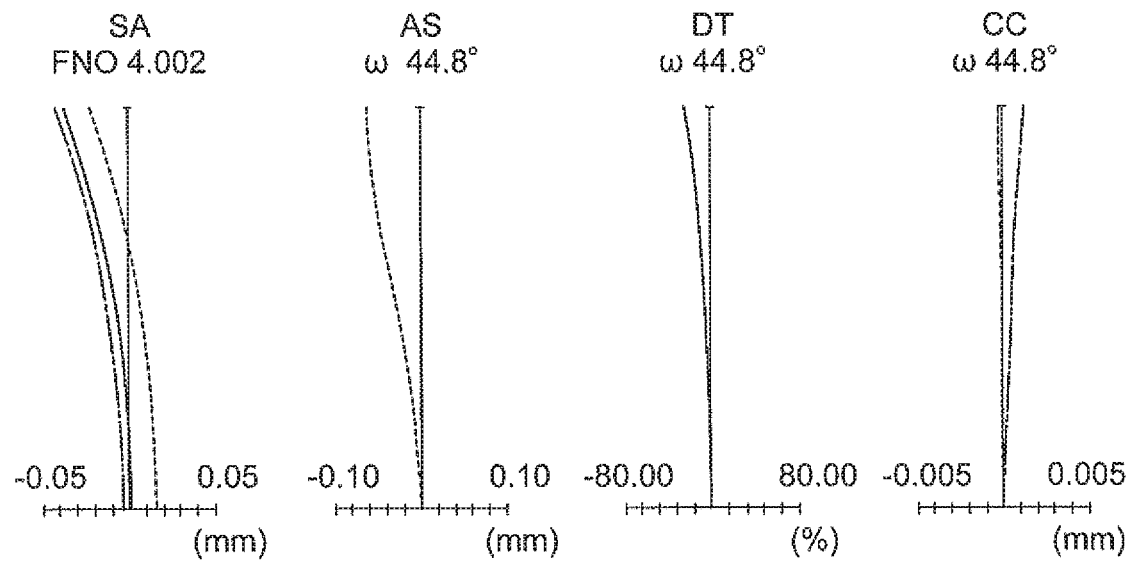

OBJECTIVE OPTICAL SYSTEM, IMAGE PICKUP APPARATUS, AND ENDOSCOPE

CROSS-REFERENCE TO RELATED APPLICATION

The present application is a continuation application of PCT/JP2018/015169 filed on Apr. 11, 2018 which is based upon and claims the benefit of priority from Japanese Patent Application No. 2017-091146 filed on May 1, 2017; the entire contents of which are incorporated herein by reference.

BACKGROUND OF THE INVENTION

Field of the Invention

The present invention relates to an optical system having a focusing function, and particularly to an endoscope objective lens which enables a close observation, and a taking lens of other cameras such as a compact camera for consumer use. Moreover, the present invention relates to an image pickup apparatus and an endoscope.

Description of the Related Art

A commonly-used objective lens for an endoscope has a wide depth of field. In the commonly-used objective lens for an endoscope, the depth of field is in the range of 5 mm to 100 mm. In an endoscope having such an objective lens mounted, an object image is captured by an imager, and accordingly, an image of an object is provided. As an imager, a CCD (Charge Coupled Devices) or C-MOS (Complementary Metal Oxide Semiconductor) is used.

In recent years, in a diagnosis using an endoscope, achieving a high-quality image has been sought for improving an accuracy of diagnosis. In order to fulfil this requirement, increase in number of pixels is progressed in an imager. In an imager in which increase in number of pixels is progressed, or in other words, in a high-definition imager, an area of a pixel becomes small.

When a point of an object is imaged by an objective lens, a point image is formed on an image plane of the objective lens. The point image has a certain spreading due to an effect of diffraction. Consequently, when the area of a pixel becomes small, unless the point image is made small accordingly, it is not possible to achieve a high-quality image even by using a high-definition imager. For making the point image small, it is necessary to make an F-number of the objective lens small.

In a case in which a size of the imager is same, it is possible to make the number of pixels large by making the area of a pixel small. However, when the number of pixels is made substantially large, the size of the imager becomes large even when the area of a pixel is made small. When the size of the imager becomes large, it is necessary to make a focal length of the objective lens long.

When either the F-number of the objective lens becomes small or the focal length of the objective lens becomes long, the depth of field of the objective lens becomes narrow. In such manner, when an attempt is made to achieve an image quality higher than the image quality so far, the depth of field of the objective lens becomes narrow.

The depth of field is a range in which a sharp object image can be acquired, expressed as a range of an object side. As the depth of field of the objective lens becomes narrow, the range in which the sharp object image can be acquired becomes narrow. For securing the depth of field of the conventional level, it is preferable to impart a focusing function to the objective lens. For such reason, a need of an objective lens having a focusing function has been increasing.

Moreover, in recent years, in a field of medical endoscopes, a qualitative diagnosis of a lesion part has become possible. In the qualitative diagnosis, it is necessary to carry out magnified observation of the lesion part. For such reason, in a medical endoscope, a need of an objective lens having a magnification function (hereinafter, referred to as 'magnifying endoscope objective lens') has been intensified.

For carrying out the magnified observation of a lesion part, it is necessary to find the lesion. An observation area being narrow in the magnified observation, it is not easy to find the lesion part in the magnified observation. Therefore, in the magnifying endoscope objective lens, an ability to observe an area wider than the observation area in the magnified observation becomes necessary.

In the magnified observation, a distance from the objective lens up to an object position (hereinafter, referred to as 'object distance'), is about 1 mm to 3 mm. Whereas, in the observation of a wide area as mentioned above (hereinafter, referred to as 'normal observation'), the object distance is much longer than 3 mm.

When an optical system is arranged such that an object position at the time of normal observation and a focusing position of the objective lens coincide, an object image in the normal observation (hereinafter, referred to as 'normal image') becomes a focused image.

Whereas, the object position at the time of magnified observation is away from the object position at the time of normal observation. Moreover, the object position at the time of magnified observation is not contained in the depth of field of the objective lens. Therefore, in an optical system in which the normal image is in a focused state, the object image in the magnified observation (hereinafter, referred to as 'magnified image') is not a focused image.

For acquiring a focused magnified image even in the magnified observation, it is preferable to impart the focusing function to the objective lens. By the objective lens having the focusing function, it is possible to observe both the normal image and the magnified image in a focused state. Even for such reason, the need of an objective lens having the focusing function has been increasing.

As a magnifying endoscope objective lens, objective lenses in which at least one lens group moves along an optical axis are disclosed in Japanese Patent No. 4723628, Japanese Patent No. 3722458, Japanese Patent Application Laid-open Publication No. 2009-300489, Japanese Patent No. 4834799, Japanese Patent Application Laid-open Publication No. 2015-22161, Japanese Patent No. 5567224, and Japanese Patent No. 5567225.

In Japanese Patent No. 4723628, an objective lens including three lens groups is disclosed. The objective lens includes in order from an object side, a first lens group having a negative refractive power, a second lens group having a positive refractive power, and a third lens group having a negative refractive power. At the time of focusing, the second lens group and the third lens group move.

Objective lenses including four lens groups are disclosed in Japanese Patent No. 3722458, Japanese Patent Application Laid-open Publication No. 2015-22161, and Japanese Patent No. 5567225. The objective lenses include in order from an object side, a first lens group having a negative refractive power, a second lens group having a positive refractive power, a third lens group having a negative refractive power, and a fourth lens group having a positive refractive power. At the time of focusing, the second lens group and the third lens group move.

An objective lens including four lens groups is disclosed in Japanese Patent Application Laid-open Publication No. 2009-300489. The objective lens includes in order from an object side, a first lens group having a negative refractive power, a second lens group having a positive refractive power, a third lens group having a negative refractive power, and a fourth lens group having a positive refractive power. At the time of focusing, the second lens group and the third lens group move or the third lens group and the fourth lens group move.

An objective lens including three lens groups is disclosed in Japanese Patent No. 4834799. The objective lens includes in order from an object side, a first lens group having a positive refractive power, a second lens group having a negative refractive power, and a third lens group having a positive refractive power. At the time of focusing, one lens group moves or a part of one lens group moves.

An objective lens including three lens groups and an objective lens including four lens groups are disclosed in Japanese Patent No. 5567224. The objective lens including three lens groups includes in order from an object side, a first lens group having a positive refractive power, a second lens group having a negative refractive power, and a third lens group having a positive refractive power. At the time of focusing, the second lens group moves.

The objective lens including four lens groups includes in order from an object side, a first lens group having a negative refractive power, a second lens group having a positive refractive power, a third lens group having a negative refractive power, and a fourth lens group having a positive refractive power. At the time of focusing, the second lens group and the third lens group move.

Even in an endoscope which enables the magnified observation (hereinafter, referred to as 'magnifying endoscope'), an imager in which increase the number of pixels is made, is used. For using the imager in which increase the number of pixels is made, it is necessary to form a high-definition optical image. It is possible to realize formation of a high-definition optical image by making the F-number of the objective lens small. Therefore, even in the magnifying endoscope objective lens, it is necessary to make the F-number small.

SUMMARY OF THE INVENTION

An objective optical system according to at least some embodiments of the present invention consists of, in order from an object side to an image side, a first lens group having a negative refractive power, which is stationary all the time, a second lens group having a positive refractive power, a third lens group having a negative refractive power, and a fourth lens group having a positive refractive power, which is stationary all the time, wherein at a time of focusing from an object point at a long distance to an object point at a short distance, the second lens group moves toward the object side, and the third lens group moves toward the image side, and the following conditional expressions (1), (5), and (7) are satisfied:

$$2<fG2/f<8 \quad (1)$$

$$0.2<(t34f-t34n)/f<0.5 \quad (5)$$

$$-8<fG1/f<-2 \quad (7)$$

where, fG2 denotes a focal length of the second lens group, f denotes a focal length of the overall objective optical system at a time of focusing to an object point at a long distance, t34f denotes a distance between the third lens group and the fourth lens group at the time of focusing to an object point at a long distance, t34n denotes a distance between the third lens group and the fourth lens group at a time of focusing to an object point at a short distance, and fG1 denotes a focal length of the first lens group.

An image pickup apparatus according to at least some embodiments of the present invention comprises, an image sensor, and an objective optical system, wherein the objective optical system consists of, in order from an object side to an image side, a first lens group having a negative refractive power, which is stationary all the time, a second lens group having a positive refractive power, a third lens group having a negative refractive power, and a fourth lens group having a positive refractive power, which is stationary all the time, wherein at a time of focusing from an object point at a long distance to an object point at a short distance, the second lens group moves toward the object side, and the third lens group moves toward the image side, and the following conditional expressions (1), (5), and (7) are satisfied:

$$2<fG2/f<8 \quad (1)$$

$$0.2<(t34f-t34n)/f<0.5 \quad (5)$$

$$-8<fG1/f<-2 \quad (7)$$

where, fG2 denotes a focal length of the second lens group, f denotes a focal length of the overall objective optical system at a time of focusing to an object point at a long distance, t34f denotes a distance between the third lens group and the fourth lens group at the time of focusing to an object point at a long distance, t34n denotes a distance between the third lens group and the fourth lens group at a time of focusing to an object point at a short distance, and fG1 denotes a focal length of the first lens group.

An endoscope according to at least some embodiments of the present invention comprises, an image sensor, and an objective optical system, wherein the objective optical system consists of, in order from an object side to an image side, a first lens group having a negative refractive power, which is stationary all the time, a second lens group having a positive refractive power, a third lens group having a negative refractive power, and a fourth lens group having a positive refractive power, which is stationary all the time, wherein at a time of focusing from an object point at a long distance to an object point at a short distance, the second lens group moves toward the object side, and the third lens group moves toward the image side, and the following conditional expressions (1), (5), and (7) are satisfied:

$$2 < fG2/f < 8 \quad (1)$$

$$0.2 < (t34f - t34n)/f < 0.5 \quad (5)$$

$$-8 < fG1/f < -2 \quad (7)$$

where, fG2 denotes a focal length of the second lens group, f denotes a focal length of the overall objective optical system at a time of focusing to the object point at the long distance, t34f denotes a distance between the third lens group and the fourth lens group at the time of focusing to the object point at the long distance, t34n denotes a distance between the third lens group and the fourth lens group at a time of focusing to the object point at the short distance, and fG1 denotes a focal length of the first lens group.

BRIEF DESCRIPTION OF THE DRAWINGS

FIG. 3A, FIG. 3B, FIG. 3C, FIG. 3D, FIG. 3E, FIG. 3F, FIG. 3G, and FIG. 3H are aberration diagrams of the objective optical system of the example 1;

FIG. 5A, FIG. 5B, FIG. 5C, FIG. 5D, FIG. 5E, FIG. 5F, FIG. 5G, and FIG. 5H are aberration diagrams of the objective optical system of the example 2;

FIG. 7A, FIG. 7B, FIG. 7C, FIG. 7D, FIG. 7E, FIG. 7F, FIG. 7G and FIG. 7H are aberration diagrams of the objective optical system of the example 3;

FIG. 9A, FIG. 9B, FIG. 9C, FIG. 9D, FIG. 9E, FIG. 9F, FIG. 9G, and FIG. 9H are aberration diagrams of the objective optical system of the example 4;

FIG. 11A, FIG. 11B, FIG. 11C, FIG. 11D, FIG. 11E, FIG. 11F, FIG. 11G, and FIG. 11H are aberration diagrams of the objective optical system of the example 5.

DETAILED DESCRIPTION OF THE INVENTION

Figure 1:
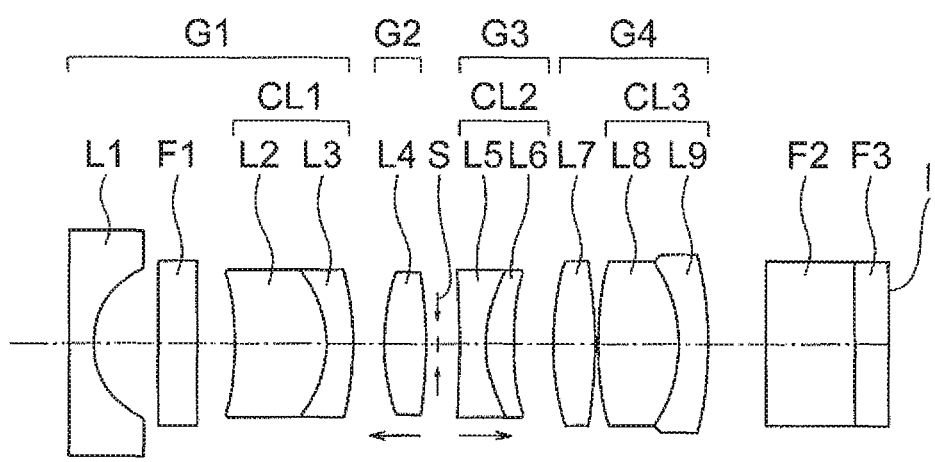
FIG. 1 is a cross-sectional view showing a specific arrangement of an objective optical system of the present embodiment.
Figure 2A:
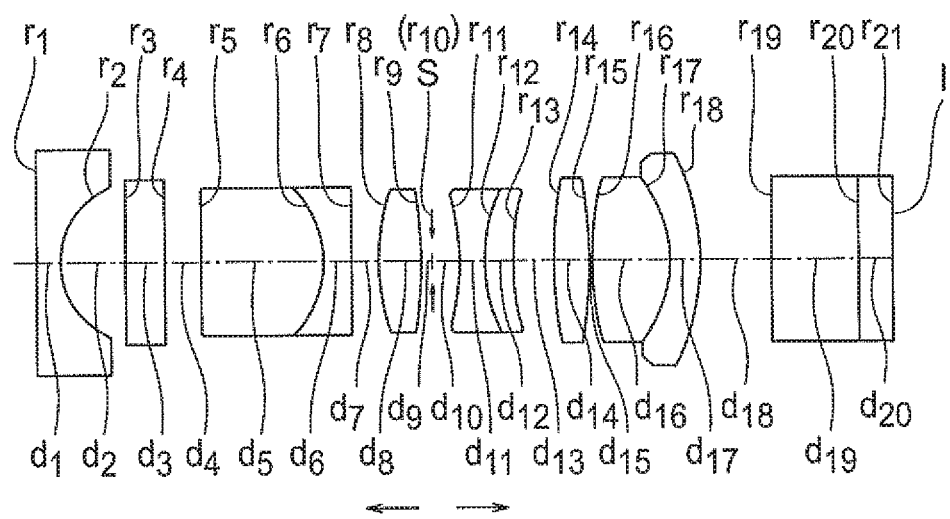
FIG. 2A and FIG. 2B are cross-sectional views of an objective optical system of an example 1.
Figure 2B:
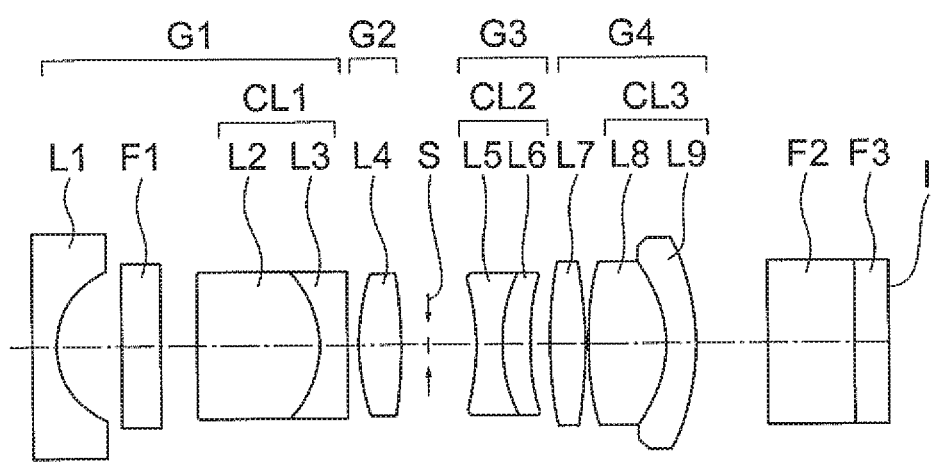
Figure 4A:
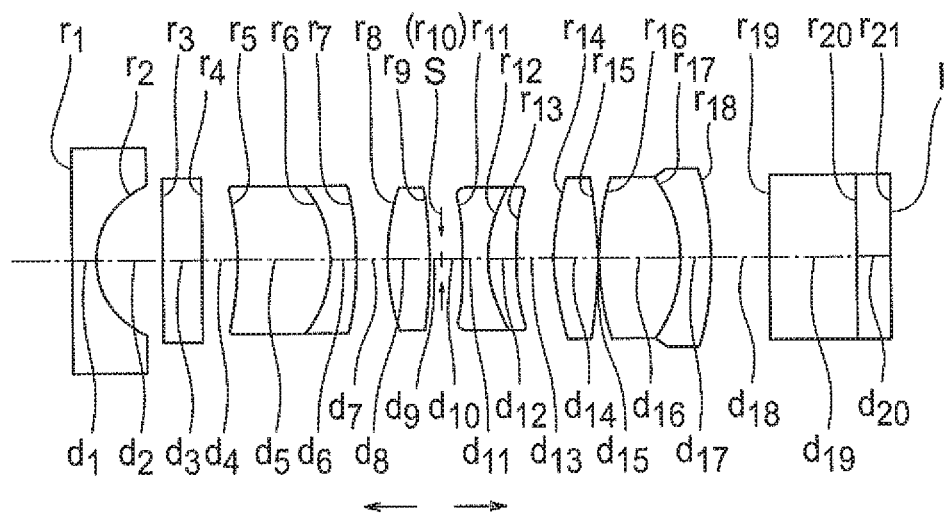
FIG. 4A and FIG. 4B are cross-sectional views of an objective optical system of an example 2.
Figure 4B:
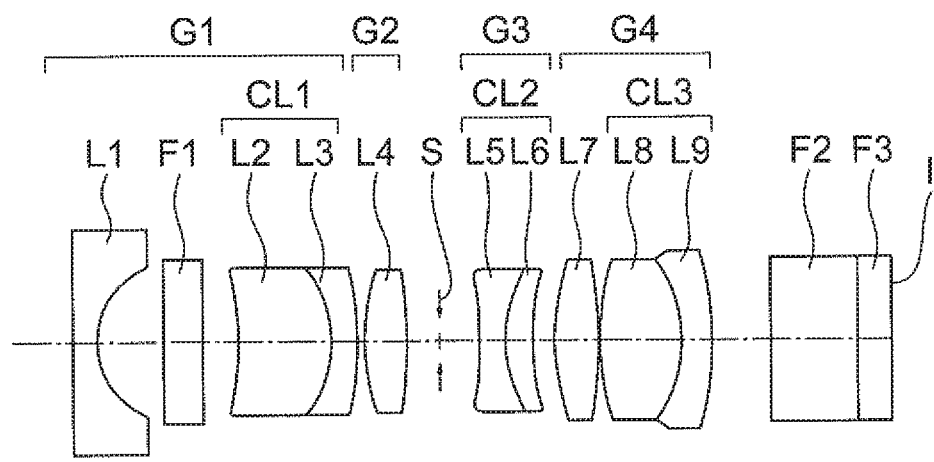
Figure 6A:
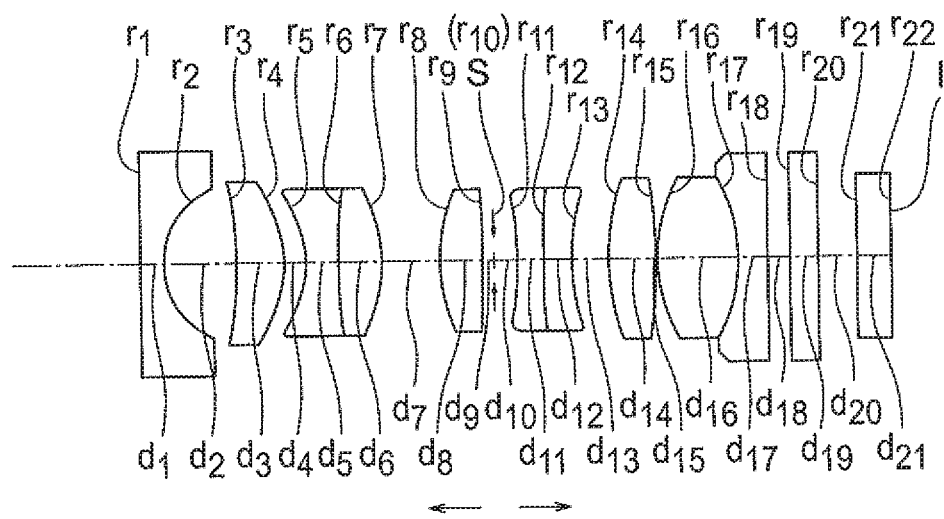
FIG. 6A and FIG. 6B are cross-sectional views of an objective optical system of an example 3.
Figure 6B:
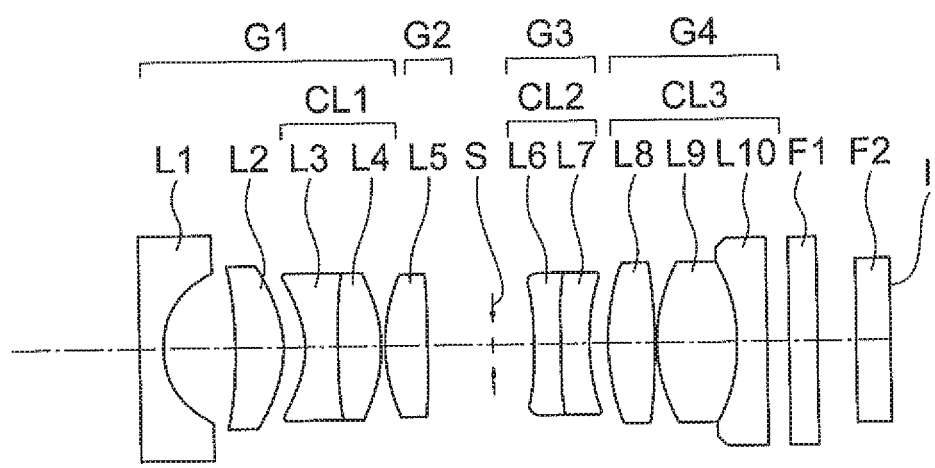
Figure 8A:
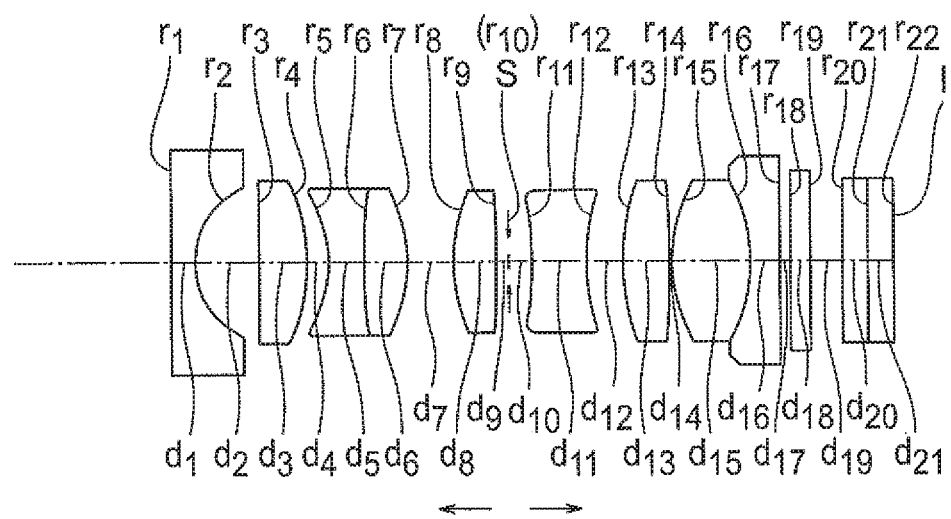
FIG. 8A and FIG. 8B are cross-sectional views of an objective optical system of an example 4.
Figure 8B:
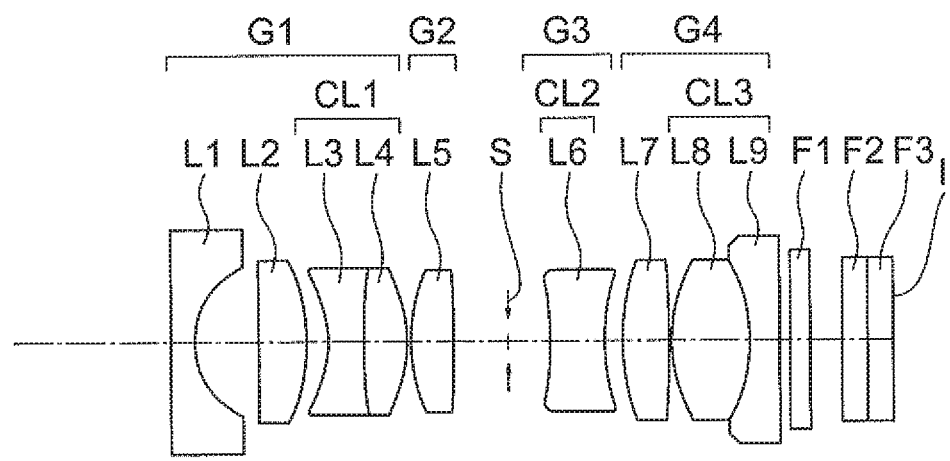
Figure 10A:
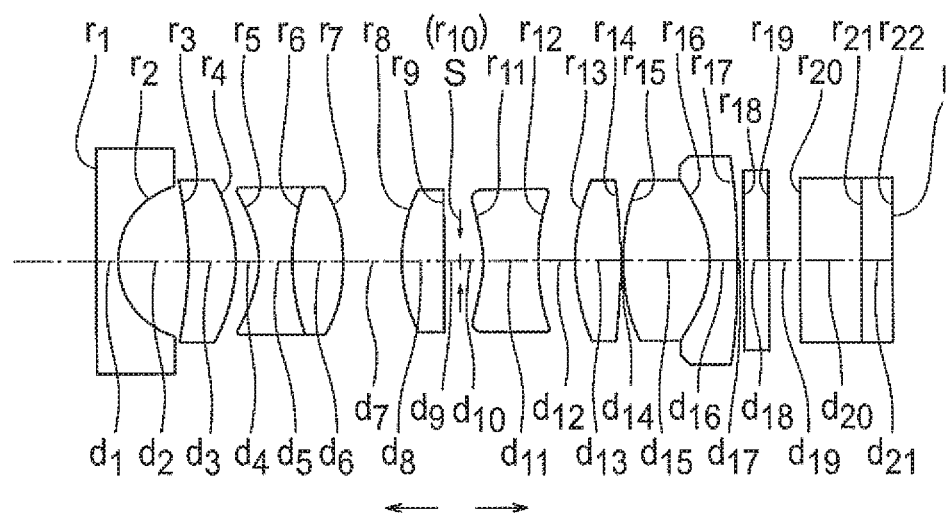
FIG. 10A and FIG. 10B are cross-sectional views of an objective optical system of an example 5.
Figure 10B:
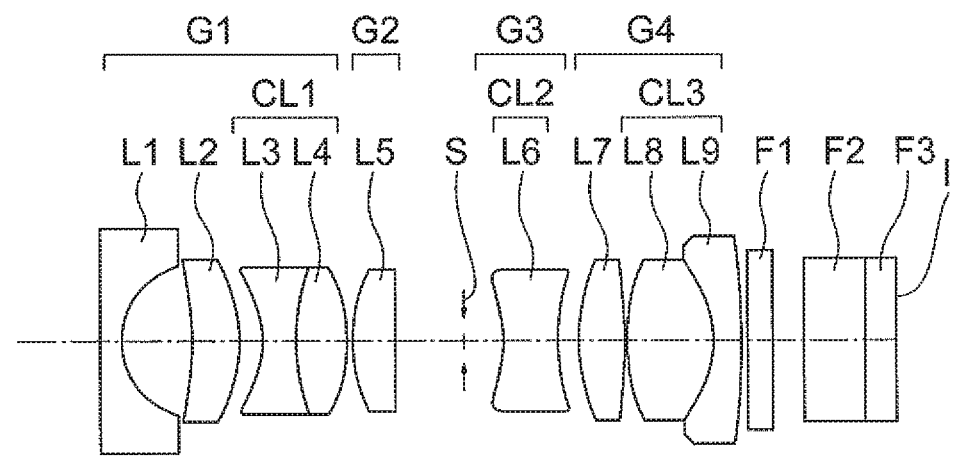

Reasons for adopting such arrangements and effects thereof in objective optical system according to the present embodiment, will be described below by referring to the accompanying diagrams. However, the present invention is not restricted to the objective optical system according to the following embodiment.

It is possible to use an objective optical system according to the present embodiment for an objective lens of an endoscope. In this case, the objective optical system according to the present embodiment enables to carry out a normal observation and a magnified observation with one optical system, in an endoscopic observation. For this, the objective optical system includes a plurality of lens groups, and at least one of the plurality of lens groups moves on an optical axis. Accordingly, it is possible to carry out the normal observation at a time of focusing to an object point at a long distance and to carry out the magnified observation at a time of focusing to an object point at a short distance. In other words, an observation of a level equivalent to a microscopic observation as an extension of the magnified observation, and magnified observation with even higher magnification is possible.

The objective optical system according to the present embodiment includes in order from an object side, a first lens group having a negative refractive power, a second lens group having a positive refractive power, a third lens group having a negative refractive power, and a fourth lens group having a positive refractive power, and at a time of focusing from an object point at a long distance to an object point at a short distance, the second lens group moves toward the object side and the third lens group moves toward an image side, and the following conditional expression (1) is satisfied:

$$2 < fG2/f < 8 \quad (1)$$

where, fG2 denotes a focal length of the second lens group, and f denotes a focal length of the overall objective optical system at a time of focusing to an object point at a long distance.

The objective optical system according to the present embodiment includes in order from the object side, the first lens group having a negative refractive power, the second lens group having a positive refractive power, the third lens group having a negative refractive power, and the fourth lens group having a positive refractive power. By making such arrangement, it is possible not only to suppress an aberration fluctuation at the time of focusing to minimum, but also to realize small-sizing of the overall optical system easily.

An object point distance differs at a time of normal observation and at a time of magnified observation. Moreover, the object point distance varies continuously from that at the time of normal observation to that at the time of magnified observation. In the observation, even when the object point distance varies, it is preferable that a sharp image be formed. For this, it is necessary to move at least one lens group.

In the objective optical system according to the present embodiment, focusing is carried out by moving the second lens group and the third lens group. At the time of focusing from an object point at a long distance to an object point at a short distance, the second lens group moves toward the object side and the third lens group moves toward the image side.

By moving the second lens group and the third lens group, it is possible to carry out focusing, no matter wherever the object point is positioned between a long distance and a short distance. It is possible to carry out the normal observation at the time of focusing to an object point at a long distance and to carry out the magnified observation at the time of focusing to an object point at a short distance.

Both the second lens group and the third lens group have a focusing function. As the object point distance varies, a position of an image plane varies. By moving of the second lens group and the third lens group, an arrangement is made such that the position of the image plane does not vary even when the object point distance varies.

Moreover, by using the second lens group and the third lens group as a lens group for focusing, it is possible to distribute the refractive power in a case of carrying out focusing by one lens group, to the second lens group and the third lens group. As a result, it is possible to make small both the refractive power of the second lens group and the refractive power of the third lens group. Consequently, even at a time of focusing, it is possible to maintain a state where various aberrations are corrected favorably.

In a case of carrying out focusing by one lens group, when the refractive power of the lens group is small, an amount of movement has to be made large in order to secure a desired focusing range. In the objective optical system according to the present embodiment, a sign of the refractive power of the second lens group and a sign of the refractive power of the third lens group differ. Therefore, even when the refractive power of each lens group is small, it is possible to secure the desired focusing range without making the amount of movement large.

At the time of focusing, the second lens group and the third lens group move along an optical axis. Whereas, the first lens group and the fourth lens group are stationary all the time. In the following description, a frame member holding the first lens group and a frame member holding the fourth lens group are fixed frames, and a frame member holding the second lens group and a frame member holding the third lens group are movable frames.

The fixed frame of the first lens group and the movable frame of the second lens group are different frame members. Moreover, the fixed frame of the fourth lens group and the movable frame of the third lens group are different frame members.

In a movement of the movable frame, an outer peripheral surface of the movable frame moves along an inner peripheral surface of the fixed frame or an inner peripheral surface of the movable frame moves along an outer peripheral surface of the fixed frame. When the two surfaces make a perfect contact, the movement of the movable frame cannot be carried out smoothly due to friction. Therefore, a clearance is provided between the two surfaces.

In the movement of the movable frame, it is preferable that an amount of shift of a center of the movable frame with respect to a center of the fixed frame be small. Smaller an amount of clearance, smaller is the amount of shift. The amount of shift corresponds to an amount of decentration of the second lens group with respect to the first lens group and an amount of decentration of the third lens group with respect to the forth lens group. Therefore, smaller the amount of clearance, smaller is the amount of decentration.

However, as mentioned above, it is not possible to make the amount of clearance zero. Therefore, it is not possible to make the amount of decentration of the second lens group with respect to the first lens group and the amount of decentration of the third lens group with respect to the fourth lens group zero. When a decentration occurs in an optical system, an imaging performance is degraded. Therefore, it is preferable to make the amount of decentration as small as possible.

Conditional expression (1) is a conditional expression related to the focal length of the second lens group. As mentioned above, the clearance is provided between the movable frame and the fixed frame. Consequently, in the objective optical system according to the present embodiment, the amount of decentration of the second lens group becomes large as compared to a case in which the second lens group is fixed. Therefore, it is preferable to satisfy conditional expression (1).

In a case of falling below a lower limit value of conditional expression (1), the refractive power of the second lens group becomes excessively large. In this case, since the amount of decentration of the second lens group becomes large, the imaging performance is degraded remarkably.

In a case of exceeding an upper limit value of conditional expression (1), the refractive power of the second lens group becomes excessively small. In this case, the amount of decentration of the second lens group becomes small. However, the amount of movement of the second lens group becomes large. As a result, the overall length of the optical system becomes long. Therefore, it is not preferable to exceed the upper limit value of conditional expression (1).

It is preferable that the following conditional expression (1') be satisfied instead of conditional expression (1).

$$2.5 < fG2/f < 8 \qquad (1')$$

It is more preferable that the following conditional expression (1") be satisfied instead of conditional expression (1).

$$3 < fG2/f < 6 \qquad (1'')$$

By satisfying either conditional expression (1') or conditional expression (1"), even when the second lens group is decentered with respect to the first lens group, it is possible to suppress effectively the degradation of the imaging performance and an increase in the overall length of the optical system.

An example of a specific arrangement of the objective optical system according to the present embodiment will be described below. FIG. 1 is a cross-sectional view showing a specific arrangement of the objective optical system according to the present embodiment.

The objective optical system includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes in order from the object side, a first lens L1 having a negative refractive power, a second lens L2 having a positive refractive power, and a third lens L3 having a negative refractive power. The second lens L2 and the third lens L3 are cemented and form a cemented lens CL1.

The second lens group G2 includes a fourth lens L4 having a positive refractive power.

The third lens group G3 includes in order from the object side, a fifth lens L5 having a negative refractive power and a sixth lens L6 having a positive refractive power. The fifth lens L5 and the sixth lens L6 are cemented and form a cemented lens CL2.

The fourth lens group G4 includes in order from the object side, a seventh lens L7 having a positive refractive power, an eighth lens L8 having a positive refractive power, and a ninth lens L9 having a negative refractive power. The eighth lens L8 and the ninth lens L9 are cemented and form a cemented lens CL3.

Moreover, focusing is carried out by moving the second lens group G2 and the third lens group G3. At the time of focusing from an object point at a long distance to an object point at a short distance, the second lens group G2 moves toward the object side and the third lens group G3 moves toward an image side.

An aperture stop S is disposed between the second lens group G2 and the third lens group G3.

A first plane parallel plate F1 is disposed between the first lens L1 and the second lens L2. It is possible to dispose the first plane parallel plate F1 at an arbitrary position in the objective optical system. A second plane parallel plate F2 and a third plane parallel plate F3 are disposed on the image side of the ninth lens L9. The second plane parallel plate F2 and the third plane parallel plate F3 are cemented.

The first plane parallel plate F1 is a filter for cutting off light of specific wavelengths such as laser light of YAG laser (light of wavelength 1060 nm), laser light of semiconductor laser (light of wavelength 810 nm), or light of a wavelength of a near infrared region.

The second plane parallel plate F2 and the third plane parallel plate F3 are cover glasses of an imager. An imager (not shown in diagram) is disposed on the image side of the third plane parallel plate F3. An image-side surface of the third plane parallel plate F3 is an image plane (image pickup surface) I. The image pickup surface of the imager coincides with the image-side surface of the third plane parallel plate F3.

In the objective optical system according to the present embodiment, be is preferable that the following conditional expression (2) is satisfied:

$$-8 < fG3/f < -2 \quad (2)$$

where, fG3 denotes a focal length of the third lens group, and f denotes the focal length of the overall objective optical system at the time of focusing to an object point at a long distance.

Conditional expression (2) is a conditional expression related to the focal length of the third lens group. As mentioned above, the clearance is provided between the movable frame and the fixed frame. Consequently, in the objective optical system according to the present embodiment, the amount of decentration of the third lens group becomes larger as compared to a case in which the third lens group is fixed. Therefore, it is preferable to satisfy conditional expression (2).

In a case of falling below a lower limit value of conditional expression (2), the refractive power of the third lens group becomes excessively small. In this case, the amount of decentration of the third lens group becomes small. However, the amount of movement of the third lens group becomes large. As a result, the overall length of the optical system becomes long. Therefore, falling below the lower limit value of conditional expression (2) is not preferable.

In a case of exceeding an upper limit value of conditional expression (2), the refractive power of the third lens group becomes excessively large. In this case, since the amount of decentration of the third lens group becomes large, the imaging performance is degraded remarkably.

In the objective optical system according to the present embodiment, it is preferable that the following conditional expression (3) be satisfied:

$$0.5 < (t12f - t12n)/(t34f - t34n) < 4 \quad (3)$$

where, t12f denotes a distance between the first lens group and the second lens group at the time of focusing to an object point at a long distance, f12n denotes a distance between the first lens group and the second lens group at a time of focusing to an object point at a short distance, t34f denotes a distance between the third lens group and the fourth lens group at the time of focusing to an object point at a long distance, and t34n denotes a distance between the third lens group and the fourth lens group at the time of focusing to an object point at a short distance.

Conditional expression (3) is related to the amount of movement of the second lens group and the amount of movement of the third lens group.

In a case of falling below a lower limit value of conditional expression (3), the distance between the first lens group and the second lens group becomes excessively short. Consequently, it becomes difficult to secure a space necessary for the movement of the second lens group. In a case of exceeding an upper limit value of conditional expression (3), the distance between the third lens group and the fourth lens group becomes excessively short. Consequently, it becomes difficult to secure a space necessary for the movement of the third lens group.

In the objective optical system according to the present embodiment, out of focusable distances, it is possible to make a distance nearest to the optical system approximately 2 mm for example. For this, it is preferable to satisfy conditional expression (3).

In a case of not satisfying conditional expression (3), it becomes difficult to secure the amount of movement of the second lens group and the amount of movement of the third lens group. Therefore, it is not possible to focus to an object point positioned at a short distance such as an object point positioned at approximately 2 mm from the optical system. As a result, an observation with an adequately high magnification becomes difficult.

Moreover, in a case in which it is not possible to secure the space necessary for the movement, the amount of movement of the second lens group has to be made small or the amount of movement of the third lens group has to be made small in order to be accommodated in a narrow space.

For making the amount of movement of the lens group small, the refractive power of the lens group has to be made large. However, when the refractive power of the lens group is made large, a sensitivity of an image-plane position at the second lens group becomes high or a sensitivity of an image-plane position at the third lens group becomes high.

As a result, a problem due to a manufacturing error, such as a problem of a shift in the image-plane position with respect to a shift in a position of the second lens group becoming large or a problem of a shift in the image-plane position with respect to a shift in a position of the third lens group becoming large is susceptible to occur. The sensitivity of the image-plane position is a ratio of the shift in the image-plane position to the shift in the position of the lens group.

In the objective optical system according to the present embodiment, it is preferable that the following conditional expression (4) be satisfied:

$$0.2 < (t12f - t12n)/f < 1.2 \quad (4)$$

where, t12f denotes the distance between the first lens group and the second lens group at the time of focusing to an object point at a long distance, t12n denotes the distance between the first lens group and the second lens group at the time of focusing to an object point at a short distance, and f denotes the focal length of the overall objective optical system at the time of focusing to an object point at a long distance.

In a case of falling below a lower limit value of conditional expression (4), it becomes difficult to secure the space necessary for the movement of the second lens group similarly as in a case of falling below the lower limit value of conditional expression (3).

In a case of exceeding an upper limit value of conditional expression (4), the distance between the first lens group and the second lens group becomes excessively long. In this case, it is possible to secure the space for the movement of the second lens group. However, this leads to making the optical system large-sized.

In the objective optical system according to the present embodiment, it is preferable that the following conditional expression (5) be satisfied:

$$0.2<(t34f-t34n)/f<0.5 \quad (5)$$

where, t34f denotes the distance between the third lens group and the fourth lens group at the time of focusing to an object point at a long distance, t34n denotes the distance between the third lens group and the fourth lens group at the time of focusing to an object point at a short distance, and f denotes the focal length of the overall objective optical system at the time of focusing to an object point at a long distance.

In a case of falling below a lower limit value of conditional expression (5), it becomes difficult to secure the space necessary for the movement of the third lens group similarly as in a case of exceeding the upper limit value of conditional expression (3).

In a case of exceeding an upper limit value of conditional expression (5), the distance between the third lens group and the fourth lens group becomes excessively long. In this case, it is possible to secure the space necessary for the movement of the third lens group. However, this leads to making the optical system large-sized.

In the objective optical system according to the present embodiment, it is preferable that the following conditional expression (6) be satisfied:

$$1<fG4/f<3.5 \quad (6)$$

where, fG4 denotes a focal length of the fourth lens group, and f denotes the focal length of the overall objective optical system at the time of focusing to an object point at a long distance.

Conditional expression (6) is a conditional expression related to correction of a curvature of field.

In a case of falling below a lower limit value of conditional expression (6), the image plane is inclined toward an under side. In a case of exceeding an upper limit value of conditional expression (6), the image plane is inclined toward an over side. In this case, a central portion or a peripheral portion of an image is out-of-focus. Therefore, falling below the lower limit value of conditional expression (6) and exceeding the upper limit value of conditional expression (6) are not preferable.

In the objective optical system according to the present embodiment, it is preferable that the following conditional expression (7) be satisfied:

$$-8<fG1/f<-2 \quad (7)$$

where, fG1 denotes a focal length of the first lens group, and f denotes the focal length of the overall objective optical system at the time of focusing to an object point at a long distance.

Conditional expression (7) is a conditional expression related to correction of a chromatic aberration of magnification.

In a case of falling below a lower limit value of conditional expression (7), correction of both the chromatic aberration of magnification for a C-line and the chromatic aberration of magnification for an F-line becomes excessive. Therefore, falling below the lower limit value of conditional expression (7) is not preferable.

In a case of exceeding an upper limit value of conditional expression (7), a balance of a longitudinal chromatic aberration for the C-line and a longitudinal chromatic aberration for the F-line is disrupted. Moreover, the chromatic aberration of magnification is corrected inadequately. In this case, in a peripheral portion of an image, there is a degradation of a contrast due to a chromatic blurring. Therefore, exceeding the upper limit value of conditional expression (7) is not preferable.

In the objective optical system according to the present embodiment, it is preferable that the following conditional expression (8) be satisfied:

$$-1.8<fG2/fG3<-1 \quad (8)$$

where, fG2 denotes the focal length of the second lens group, and fG3 denotes the focal length of the third lens group.

Conditional expression (8) is a conditional expression for making both the refractive power of the second lens group and the refractive power of the third lens group an appropriate refractive power. In other words, conditional expression (8) is a conditional expression suppressing a fluctuation in the image-plane position at the time of focusing and contributing to small-sizing of the optical system.

In a case of falling below a lower limit value of conditional expression (8), the refractive power of the second lens group becomes excessively small. In this case, the amount of movement of the second lens group becomes large. Consequently, this leads to making the optical system large-sized.

In a case of exceeding an upper limit value of conditional expression (8), the refractive power of the third lens group becomes excessively large. In this case, a fluctuation in the curvature of field due to focusing becomes large. Consequently, there occurs a remarkable difference between the image-plane position at the time of normal observation and the image-plane position at the time of magnified observation. Therefore, exceeding the upper limit value of conditional expression (8) is not preferable.

In the objective optical system according to the present embodiment, it is preferable that the fourth lens group include in order from the object side, at least a first sub lens group and a second sub lens group, the first sub lens group include a positive lens, the second sub lens group include a cemented lens of a positive lens and a negative lens, and the following conditional expression (9) be satisfied:

$$0.45<fG4SUB1/fG4SUB2<1.15 \quad (9)$$

where, fG4SUB1 denotes a focal length of the first sub lens group, and fG4SUB2 denotes a focal length of the second sub lens group.

Conditional expression (9) is a conditional expression related to a ratio of the refractive power of two sub lens groups in the fourth lens group. By making the refractive power of two sub lens groups appropriate refractive power, it is possible to suppress to minimum the fluctuation which has an effect on correction of the curvature of field.

In a case of falling below a lower limit value of conditional expression (9), the curvature of field becomes excessively under. In a case of exceeding an upper limit value of conditional expression (9), the curvature of field becomes excessively over. Therefore, falling below the lower limit value of conditional expression (9) and exceeding the upper limit value of conditional expression (9) are not preferable.

In the objective optical system according to the present embodiment, it is preferable that the first lens group include an object-side lens and a sub lens group having a positive refractive power, the object-side lens be positioned nearest to an object, the sub lens group be positioned on the image side of the object-side lens, and the following conditional expression (10) be satisfied:

$$-8 < fG1Lo/fG1SUB < -3.5 \quad (10)$$

where, fG1Lo denotes a focal length of the object-side lens, and
fG1SUB denotes a focal length of the sub lens group.

Conditional expression (10) is a conditional expression related to correction of the fluctuation in the curvature of field due to a variation in the focal length.

In a case of falling below a lower limit value of conditional expression (10), the curvature of field at an object point at a long distance becomes largely under. In a case of exceeding an upper limit value of conditional expression (10), the curvature of field at an object point at a short distance becomes largely under. Therefore, falling below the lower limit value of conditional expression (10) and exceeding the upper limit value of conditional expression (10) are not preferable.

In the objective optical system according to the present embodiment, it is preferable that the first lens group include a cemented lens of a first positive lens and a first negative lens, and the following conditional expression (11) be satisfied.

$$-1.6 < fG1Cp/fG1Cn < -0.4 \quad (11)$$

where, fG1Cp denotes a focal length of the first positive lens, and
fG1Cn denotes a focal length of the first negative lens.

Conditional expression (11) is a conditional expression related to correction of the longitudinal chromatic aberration and correction of the chromatic aberration of magnification. In the first lens group, a fluctuation in a chromatic aberration due to a variation in the object-point distance occurs. By satisfying conditional expression (11), it becomes possible to suppress the fluctuation in the chromatic aberration small.

In a case of falling below a lower limit value of conditional expression (11), the chromatic aberration of magnification at the time of focusing to an object point at a short distance becomes large. Therefore, falling below the lower limit value of conditional expression (11) is not preferable.

In a case of exceeding an upper limit value of conditional expression (11), the fluctuation in the longitudinal chromatic aberration with respect to the variation in the object-point distance becomes large. Particularly, the longitudinal chromatic aberration at the time of focusing to an object point at a long distance becomes large. In such manner, the fluctuation in the longitudinal chromatic aberration and the increase in the longitudinal chromatic aberration cause a degradation of contrast. Therefore, exceeding the upper limit value of conditional expression (11) is not preferable.

It is preferable that the objective optical system according to the present embodiment include an aperture stop, and the following conditional expression (12) be satisfied:

$$0.3 < fGF/fGR < 0.75 \quad (12)$$

where, fGF denotes a focal length of a front group at the time of focusing to an object point at a long distance, and
fGR denotes a focal length of a rear group at the time of focusing to an object point at a long distance, and here
the front group is a lens group including all lens groups positioned on the object side of the aperture stop, and
the rear group is a lens group including all lens groups positioned on an image side of the aperture stop.

It is possible to divide the objective optical system according to the present embodiment into the front group and the rear group, with the aperture stop as a boundary between the front group and the rear group. The front group is a lens group including all the lens groups positioned on the object side of the aperture stop. The rear group is a lens group including all the lens groups positioned on the image side of the aperture stop.

It is preferable that the ratio of the refractive power of the front group and the refractive power of the rear group be in the range of conditional expression (12). When the ratio of the refractive power of the front group and the refractive power of the rear group is in the range of conditional expression (12), it is possible to correct the curvature of field favorably.

In a case of falling below a lower limit value of conditional expression (12), the image plane is inclined substantially to the over side. In a case of exceeding an upper limit value of conditional expression (12), the image plane is inclined substantially to the under side. Therefore, fallings below the lower limit value of conditional expression (12) and exceeding the upper limit value of conditional expression (12) are not preferable.

It is more preferable that the following conditional expression (12') be satisfied instead of conditional expression (12).

$$0.38 < fGF/fGR < 0.52 \quad (12')$$

When the refractive power of the front group and the refractive power of the rear group are in the range of conditional expression (12'), it is possible to correct the curvature of field even more favorably.

In the objective optical system according to the present embodiment, it is preferable that the following conditional expression (13) be satisfied:

$$2.5 < Fno < 5 \quad (13)$$

where,

Fno denotes an F-number at the time of focusing to an object point at a long distance.

Conditional expression (13) is a conditional expression related to the F-number of the objective optical system according to the present embodiment.

In a case of falling below a lower limit value of conditional expression (13), it is possible to realize a bright optical system but the depth of field becomes shallow. Therefore, falling below the lower limit value of conditional expression (13) is not preferable.

In a high-definition imager, a reproducible spatial frequency becomes high. Therefore, the objective optical system is also required to have a high imaging performance at a spatial frequency suitable for a high-definition imager. For this, a point image which is formed by the objective optical system has to be made small.

The size of the point image is affected by diffraction. For making the point image small, it is necessary to make the F-number of the objective optical system small.

In a case of exceeding an upper limit value of conditional expression (13), it is not possible to make the F-number of the objective optical system adequately small. In this case, it is not possible to make the point image small due to the effect of diffraction. In other words, it is not possible to improve the imaging performance at the spatial frequency suitable for a high-definition imager.

In the objective optical system according to the present embodiment, a cemented lens may be disposed on the object side of the aperture stop and near the aperture stop.

To have a high imaging performance at the spatial frequency suitable for a high-definition imager, correction of the longitudinal chromatic aberration becomes significant. By disposing a cemented lens on the object side of the aperture stop and adjacent to the aperture stop, it is possible to correct the longitudinal chromatic aberration adequately.

It is preferable that the cemented lens is disposed near the aperture stop. Accordingly, a location of disposing the cemented lens may not be adjacent to the aperture stop. For instance, the cemented lens may be disposed sandwiching a single lens. Even when such arrangement is made, it is possible to correct the longitudinal chromatic aberration adequately.

Moreover, it is possible to use the objective optical system according to the present embodiment for an optical instrument other than endoscope.

For instance, it is possible to use the objective optical system according to the present embodiment for an image pickup optical system of a digital camera. In digital camera photography, sometimes macro photography exceeding equal magnification is to be carried out. In such case, an amount of lens drawn out becomes large sometimes, and a micro converter lens is to be mounted in many cases. However, by using the objective optical system of the present embodiment as an image pickup optical system, it is possible to carry out macro photography of a high magnification than even before without mounting the micro converter lens.

Moreover, generally, in a micro lens, focusing is carried out by drawing a first lens group toward the object side, and floating a plurality of lens groups. On the other hand, when the objective optical system according to the present embodiment is used, macro photography with inner focusing becomes possible. Therefore, it is advantageous in a case where photographing is performed after determining a working distance.

Furthermore, it is also possible to use the objective optical system according to the present embodiment for an image pickup optical system of a mobile equipment such as mobile telephone. By doing so, the macro photography is readily enjoyable.

Examples of objective optical systems will be described below in detail by referring to the accompanying diagrams. However, the present invention is not restricted to the examples described below.

Lens cross-sectional views of each example will be described below.

FIG. 2A, FIG. 4A, FIG. 6A, FIG. 8A, and FIG. 10A are cross-sectional views in a normal observation state.

FIG. 2B, FIG. 4B, FIG. 6B, FIG. 8B, and FIG. 10B are cross-sectional views in a magnified observation state.

Aberration diagrams of each example will be described below.

FIG. 3A, FIG. 5A, FIG. 7A, FIG. 9A, and FIG. 11A show a spherical aberration (SA) in the normal observation state.

FIG. 3B, FIG. 5B, FIG. 7B, FIG. 9B, and FIG. 11B show an astigmatism (AS) in the normal observation state.

FIG. 3C, FIG. 5C, FIG. 7C, FIG. 9C, and FIG. 11C show a distortion (DT) in the normal observation state.

FIG. 3D, FIG. 5D, FIG. 7D, FIG. 9D, and FIG. 11D show a chromatic aberration of magnification (CC) in the normal observation state.

FIG. 3E, FIG. 5E, FIG. 7E, FIG. 9E, and FIG. 11E show a spherical aberration (SA) in the magnified observation state.

FIG. 3F, FIG. 5F, FIG. 7F, FIG. 9F, and FIG. 11F show an astigmatism (AS) in the magnified observation state.

FIG. 3G, FIG. 5G, FIG. 7G, FIG. 9G, and FIG. 11G show a distortion (DT) in the magnified observation state.

FIG. 3H, FIG. 5H, FIG. 7H, FIG. 9H, and FIG. 11H show a chromatic aberration of magnification (CC) in the magnified observation state.

In each aberration diagram, a horizontal axis indicates an aberration amount. For the spherical aberration, the astigmatism, and the chromatic aberration of magnification, the unit of the aberration amount is mm. Moreover, for the distortion, the unit of the aberration amount is % (percentage). Furthermore, ω denotes a half angle of view, and the unit thereof is ° (degree), and FNO denotes an F-number. The unit of wavelength of an aberration curve is nm.

Example 1

An objective optical system according to an example 1 will be described below. The objective optical system of the example 1 includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes a planoconcave negative lens L1 of which an object side is a flat surface, a positive meniscus lens L2 having a convex surface directed toward an image side, and a biconcave negative lens L3. Here, the positive meniscus lens L2 and the biconcave negative lens L3 form a cemented lens CL1.

The second lens group G2 includes a biconvex positive lens L4.

The third lens group G3 includes a biconcave negative lens L5 and a positive meniscus lens L6 having a convex surface directed toward the object side. Here, the biconcave negative lens L5 and the positive meniscus lens L6 form a cemented lens CL2.

The fourth lens group G4 includes a biconvex positive lens L7, a biconvex positive lens L8, and a negative meniscus lens L9 having a convex surface directed toward the image side. Here, the biconvex positive lens L8 and the negative meniscus lens L9 form a cemented lens CL3.

An aperture stop S is disposed between the second lens group G2 and the third lens group G3.

At a time of focusing, the second lens group G2 and the third lens group G3 move. At a time of focusing to an object point at a short distance from a state of being focused to an object point at a long distance, the second lens group G2 moves toward the object side and the third lens group G3 moves toward the image side.

A plane parallel plate F1 is disposed on the image side of the planoconcave negative lens L1. A plane parallel plate F2 and a plane parallel plate F3 are disposed on the image side of the fourth lens group G4.

The plane parallel plate F1 is a filter for cutting off light of specific wavelengths such as laser light of YAG laser (light of wavelength 1060 nm), laser light of semiconductor laser (light of wavelength 810 nm), or light of wavelength of a near infrared region. The plane parallel plate F2 and the plane parallel plate F3 are cover glasses of an imager.

Example 2

An objective optical system according to an example 2 will be described below. The objective optical system of the example 2 includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes a planoconcave negative lens L1 of which an object side is a flat surface, a positive meniscus lens L2 having a convex surface directed toward an image side, and a negative meniscus lens L3 having a convex surface directed toward the image side. Here, the positive meniscus lens L2 and the negative meniscus lens L3 form a cemented lens CL1.

The second lens group G2 includes a biconvex positive lens L4.

The third lens group G3 includes a biconcave negative lens L5 and a positive meniscus lens L6 having a convex surface directed toward the object side. Here, the biconcave negative lens L5 and the positive meniscus lens L6 form a cemented lens CL2.

The fourth lens group G4 includes a biconvex positive lens L7, a biconvex positive lens L8, and a negative meniscus lens L9 having a convex surface directed toward the image side. Here, the biconvex positive lens L8 and the negative meniscus lens L9 form a cemented lens CL3.

An aperture stop S is disposed between the second lens group G2 and the third lens group G3.

At a time of focusing, the second lens group G2 and the third lens group G3 move. At a time of focusing to an object point at a short distance from a state of being focused to an object point at a long distance, the second lens group G2 moves toward the object side and the third lens group G3 moves toward the image side.

A plane parallel plate F1 is disposed on the image side of the planoconcave negative lens L1. A plane parallel plate F2 and a plane parallel plate F3 are disposed on the image side of the fourth lens group G4.

The plane parallel plate F1 is a filter for cutting off light of specific wavelengths such as laser light of YAG laser (light of wavelength 1060 nm), laser light of semiconductor laser (light of wavelength 810 nm), or light of wavelength of a near infrared region. The plane parallel plate F2 and the plane parallel plate F3 are cover glasses of an imager.

Example 3

An objective optical system according to an example 3 will be described below. The objective optical system of the example 3 includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes a planoconcave negative lens L1 of which an object side is a flat surface, a positive meniscus lens L2 having a convex surface directed toward an image side, a biconcave negative lens L3, and a biconvex positive lens L4. Here, the biconcave negative lens L3 and the biconvex positive lens L4 form a cemented lens CL1.

The second lens group G2 includes a biconvex positive lens L5.

The third lens group G3 includes a biconcave negative lens L6 and a positive meniscus lens L7 having a convex surface directed toward the object side. Here, the biconcave negative lens L6 and the positive meniscus lens L7 form a cemented lens CL2.

The fourth lens group G4 includes a biconvex positive lens L8, a biconvex positive lens L9, and a biconcave negative lens L10. Here, the biconvex positive lens L9 and the biconcave negative lens L10 form a cemented lens CL3.

An aperture stop S is disposed between the second lens group G2 and the third lens group G3.

At a time of focusing, the second lens group G2 and the third lens group G3 move. At a time of focusing to an object point at a short distance from a state of being focused to an object point at a long distance, the second lens group G2 moves toward the object side and the third lens group G3 moves toward the image side.

A plane parallel plate F1, a plane parallel plate F2, and a plane parallel plate F3 are disposed on the image side of the fourth lens group G4.

The plane parallel plate F1 is a filter for cutting off light of specific wavelengths such as laser light of YAG laser (light of wavelength 1060 nm), laser light of semiconductor laser (light of wavelength 810 nm), or light of wavelength of a near infrared region. The plane parallel plate F2 and the plane parallel plate F3 are cover glasses of an imager.

Example 4

An objective optical system according to an example 4 will be described below. The objective optical system of the example 4 includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes a planoconcave negative lens L1 of which an object side is a flat surface, a biconvex positive lens L2, a biconcave negative lens L3, and a biconvex positive lens L4. Here, the biconcave negative lens L3 and the biconvex positive lens L4 form a cemented lens CL1.

The second lens group G2 includes a biconvex positive lens L5.

The third lens group G3 includes a biconcave negative lens L6.

The fourth lens group G4 includes a biconvex positive lens L7, a biconvex positive lens L8, and a negative meniscus lens L9 having a convex surface directed toward the image side. Here, the biconvex positive lens L8 and the negative meniscus lens L9 form a cemented lens CL3.

An aperture stop S is disposed between the second lens group G2 and the third lens group G3.

At a time of focusing, the second lens group G2 and the third lens group G3 move. At a time of focusing to an object point at a short distance from a state of being focused to an object point at a long distance, the second lens group G2 moves toward the object side and the third lens group G3 moves toward the image side.

A plane parallel plate F1, a plane parallel plate F2, and a plane parallel plate F3 are disposed on the image side of the fourth lens group G4.

The plane parallel plate F1 is a filter for cutting off light of specific wavelengths such as laser light of YAG laser (light of wavelength 1060 nm), laser light of semiconductor laser (light of wavelength 810 nm), or light of wavelength of a near infrared region. The plane parallel plate F2 and the plane parallel plate F3 are cover glasses of an imager.

Example 5

An objective optical system according to an example 5 will be described below. The objective optical system of the example 5 includes in order from an object side, a first lens group G1 having a negative refractive power, a second lens group G2 having a positive refractive power, a third lens group G3 having a negative refractive power, and a fourth lens group G4 having a positive refractive power.

The first lens group G1 includes a planoconcave negative lens L1 of which an object side is a flat surface, a positive meniscus lens L2 having a convex surface directed toward an image side, a biconcave negative lens L3, and a biconvex positive lens L4. Here, the biconcave negative lens L3 and the biconvex positive lens L4 form a cemented lens CL1.

The second lens group G2 includes a biconvex positive lens L5.

The third lens group G3 includes a biconcave negative lens L6.

The fourth lens group G4 includes a biconvex positive lens L7, a biconvex positive lens L8, and a negative meniscus lens L9 having a convex surface directed toward the image side. Here, the biconvex positive lens L8 and the negative meniscus lens L9 form a cemented lens CL3.

An aperture stop S is disposed between the second lens group G2 and the third lens group G3.

At a time of focusing, the second lens group G2 and the third lens group G3 move. At a time of focusing to an object point at a short distance from a state of being focused to an object point at a long distance, the second lens group G2 moves toward the object side and the third lens group G3 moves toward the image side.

A plane parallel plate F1, a plane parallel plate F2, and a plane parallel plate F3 are disposed on the image side of the fourth lens group G4.

The plane parallel plate F1 is a filter for cutting off light of specific wavelengths such as laser light of YAG laser (light of wavelength 1060 nm), laser light of semiconductor laser (light of wavelength 810 nm), or light of wavelength of a near infrared region. The plane parallel plate F2 and the plane parallel plate F3 are cover glasses of an imager.

Numerical data of each example described above is shown below. In Surface data, r denotes radius of curvature of each lens surface, d denotes a distance between respective lens surfaces, ne denotes a refractive index of each lens for e-line, and vd denotes an Abbe number for each lens. Stop denotes an aperture stop.

In Various data, f denotes a focal length for e-line, Fno denotes an F number, ω denotes a half angle of view, IH denotes an image height, OBJ denotes an object distance. In a close observation state, it is possible to carry out the magnified observation.

Example 1

| Unit mm | | | | |
|---|---|---|---|---|
| Surface data | | | | |
| Surface no. | r | d | ne | vd |
| 1 | ∞ | 0.383 | 1.88815 | 40.76 |
| 2 | 1.4062 | 1.093 | | |
| 3 | ∞ | 0.638 | 1.49557 | 75.00 |
| 4 | ∞ | 0.606 | | |
| 5 | −215.6063 | 2.049 | 1.77621 | 49.60 |

-continued

| Unit mm | | | | |
|---|---|---|---|---|
| 6 | −1.7919 | 0.447 | 1.59911 | 39.24 |
| 7 | 59.7123 | Variable | | |
| 8 | 2.7313 | 0.717 | 1.59667 | 35.31 |
| 9 | −7.2342 | Variable | | |
| 10 (Stop) | ∞ | Variable | | |
| 11 | −4.1724 | 0.441 | 1.70442 | 30.13 |
| 12 | 2.7263 | 0.478 | 1.48915 | 70.23 |
| 13 | 4.4792 | Variable | | |
| 14 | 5.7382 | 0.638 | 1.77621 | 49.60 |
| 15 | −7.8439 | 0.032 | | |
| 16 | 5.5805 | 1.289 | 1.69979 | 55.53 |
| 17 | −2.1954 | 0.4785 | 1.93429 | 18.90 |
| 18 | −4.244 | 1.203 | | |
| 19 | ∞ | 1.45 | 1.51825 | 64.14 |
| 20 | ∞ | 0.55 | 1.88815 | 40.76 |
| 21 (Image pickup surface) | ∞ | | | |

| Various data | | |
|---|---|---|
| | Normal observation state | Close observation state |
| f | 1.038 | 1.249 |
| Fno | 4.2 | 4.728 |
| OBJ | 26.3 | 4.35 |
| d7 | 0.4436 | 0.1823 |
| d9 | 0.1905 | 0.4518 |
| d10 | 0.4492 | 0.7865 |
| d13 | 0.6767 | 0.3394 |
| IH | 1.0 | |
| 2ω | 160.5 | |

Example 2

| Unit mm | | | | |
|---|---|---|---|---|
| Surface data | | | | |
| Surface no. | r | d | ne | vd |
| 1 | ∞ | 0.383 | 1.88815 | 40.76 |
| 2 | 1.3878 | 1.099 | | |
| 3 | ∞ | 0.638 | 1.49557 | 75.00 |
| 4 | ∞ | 0.6 | | |
| 5 | −6.5257 | 1.542 | 1.77621 | 49.60 |
| 6 | −2.003 | 0.45 | 1.59911 | 39.24 |
| 7 | −5.8083 | Variable | | |
| 8 | 3.3916 | 0.718 | 1.59667 | 35.31 |
| 9 | −8.4609 | Variable | | |
| 10 (Stop) | ∞ | Variable | | |
| 11 | −7.1747 | 0.44 | 1.70442 | 30.13 |
| 12 | 2.3594 | 0.473 | 1.48915 | 70.23 |
| 13 | 4.8045 | Variable | | |
| 14 | 4.8345 | 0.718 | 1.77621 | 49.60 |
| 15 | −7.9744 | 0.032 | | |
| 16 | 5.5772 | 1.358 | 1.69979 | 55.53 |
| 17 | −2.4477 | 0.478 | 1.93429 | 18.90 |
| 18 | −6.2241 | 0.964 | | |
| 19 | ∞ | 1.45 | 1.51825 | 64.14 |
| 20 | ∞ | 0.56 | 1.51825 | 64.14 |
| 21 (Image pickup surface) | ∞ | | | |

| Various data | | |
|---|---|---|
| | Normal observation state | Close observation state |
| f | 1.015 | 1.184 |
| Fno | 3.725 | 4.042 |

Example 3 -continued

| Unit mm | | |
|---|---|---|
| OBJ | 26.2 | 5.25 |
| d7 | 0.5128 | 0.1576 |
| d9 | 0.1868 | 0.5420 |
| d10 | 0.3714 | 0.6516 |
| d13 | 0.6258 | 0.3456 |
| IH | 1.0 | |
| 2ω | 158.3 | |

Example 3

| Unit mm | | | | |
|---|---|---|---|---|
| Surface data | | | | |
| Surface no. | r | d | ne | νd |
| 1 | ∞ | 0.383 | 1.88815 | 40.76 |
| 2 | 1.317 | 1.176 | | |
| 3 | −7.4132 | 0.797 | 1.51825 | 64.14 |
| 4 | −2.3089 | 0.374 | | |
| 5 | −1.9522 | 0.542 | 1.72733 | 29.23 |
| 6 | 11.8496 | 0.723 | 1.77621 | 49.60 |
| 7 | −2.5443 | Variable | | |
| 8 | 2.981 | 0.718 | 1.59667 | 35.31 |
| 9 | −24.2805 | Variable | | |
| 10 (Stop) | ∞ | Variable | | |
| 11 | −5.8402 | 0.44 | 1.70442 | 30.13 |
| 12 | 25.1198 | 0.4585 | 1.48915 | 70.23 |
| 13 | 2.9224 | Variable | | |
| 14 | 3.8937 | 0.766 | 1.77621 | 49.60 |
| 15 | −17.1962 | 0.032 | | |
| 16 | 2.6593 | 1.358 | 1.69979 | 55.53 |
| 17 | −2.7452 | 0.4785 | 1.97189 | 17.47 |
| 18 | 88.9617 | 0.382 | | |
| 19 | ∞ | 0.45 | 1.51825 | 64.14 |
| 20 | ∞ | 0.6586 | | |
| 21 | ∞ | 0.55 | 1.56606 | 60.67 |
| 22 (Image pickup surface) | ∞ | | | |

| Various data | | |
|---|---|---|
| | Normal observation state | Close observation state |
| f | 1.049 | 1.334 |
| Fno | 3.615 | 3.956 |
| OBJ | 26.35 | 2.55 |
| d7 | 0.9606 | 0.0697 |
| d9 | 0.1884 | 1.0793 |
| d10 | 0.3962 | 0.7026 |
| d13 | 0.6377 | 0.3313 |
| IH | 1.0 | |
| 2ω | 160.2 | |

Example 4

| Unit mm | | | | |
|---|---|---|---|---|
| Surface data | | | | |
| Surface no. | r | d | ne | νd |
| 1 | ∞ | 0.383 | 1.88815 | 40.76 |
| 2 | 1.3137 | 1.054 | | |
| 3 | 153.3896 | 0.797 | 1.51825 | 64.14 |
| 4 | −3.5841 | 0.38 | | |
| 5 | −2.2715 | 0.542 | 1.72733 | 29.23 |
| 6 | 7.377 | 0.752 | 1.77621 | 49.60 |
| 7 | −2.6647 | Variable | | |
| 8 | 2.832 | 0.718 | 1.59667 | 35.31 |
| 9 | −19.9623 | Variable | | |
| 10 (Stop) | ∞ | Variable | | |
| 11 | −6.107 | 0.903 | 1.70442 | 30.13 |
| 12 | 4.5555 | Variable | | |
| 13 | 3.8753 | 0.766 | 1.77621 | 49.60 |
| 14 | −46.7115 | 0.032 | | |
| 15 | 2.6535 | 1.325 | 1.69979 | 55.53 |
| 16 | −2.8117 | 0.478 | 1.97189 | 17.47 |
| 17 | −38.5243 | 0.162 | | |
| 18 | ∞ | 0.32 | 1.51825 | 64.14 |
| 19 | ∞ | 0.5 | | |
| 20 | ∞ | 0.48 | 1.51825 | 64.14 |
| 21 | ∞ | 0.4 | 1.51825 | 64.14 |
| 22 (Image pickup surface) | ∞ | | | |

| Various data | | |
|---|---|---|
| | Normal observation state | Close observation state |
| f | 1.075 | 1.318 |
| Fno | 3.454 | 3.752 |
| OBJ | 26.3 | 2.66 |
| d7 | 0.772 | 0.0706 |
| d9 | 0.1884 | 0.8898 |
| d10 | 0.4165 | 0.7444 |
| d13 | 0.6307 | 0.3028 |
| IH | 1.0 | |
| 2ω | 159.7 | |

Example 5

| Unit mm | | | | |
|---|---|---|---|---|
| Surface data | | | | |
| Surface no. | r | d | ne | νd |
| 1 | ∞ | 0.383 | 1.88815 | 40.76 |
| 2 | 1.3455 | 1.162 | | |
| 3 | −5.3608 | 0.797 | 1.51825 | 64.14 |
| 4 | −2.5651 | 0.375 | | |
| 5 | −2.1661 | 0.542 | 1.72733 | 29.23 |
| 6 | 3.6031 | 0.871 | 1.77621 | 49.60 |
| 7 | −2.6936 | Variable | | |
| 8 | 2.9415 | 0.718 | 1.59667 | 35.31 |
| 9 | −27.8209 | Variable | | |
| 10 (Stop) | ∞ | Variable | | |
| 11 | −2.8799 | 0.901 | 1.48915 | 70.23 |
| 12 | 2.9507 | Variable | | |
| 13 | 3.5161 | 0.766 | 1.77621 | 49.60 |
| 14 | −10.2894 | 0.031 | | |
| 15 | 3.4931 | 1.447 | 1.69979 | 55.53 |
| 16 | −2.0392 | 0.478 | 1.97189 | 17.47 |
| 17 | −13.4569 | 0.082 | | |
| 18 | ∞ | 0.45 | 1.51825 | 64.14 |
| 19 | ∞ | 0.48 | | |
| 20 | ∞ | 1 | 1.51825 | 64.14 |
| 21 | ∞ | 0.55 | 1.56606 | 60.67 |
| 22 (Image pickup surface) | ∞ | | | |

-continued

Unit mm

Various data

|  | Normal observation state | Close observation state |
|---|---|---|
| f | 1.038 | 1.339 |
| Fno | 3.643 | 4.002 |
| OBJ | 28.5 | 2.65 |
| d7 | 0.9783 | 0.1185 |
| d9 | 0.2371 | 1.0969 |
| d10 | 0.41 | 0.6936 |
| d12 | 0.6329 | 0.3493 |
| IH | 1.0 | |
| 2ω | 152.8 | |

Next, the values of conditional expressions (1) to (13) in each example are shown below.

| Conditional expression | Example1 | Example2 | Example3 |
|---|---|---|---|
| (1)fG2/f | 3.290 | 4.091 | 4.284 |
| (2)fG3/f | −2.576 | −3.260 | −3.088 |
| (3)(t12f−t12n)/(t34f−t34n) | 0.775 | 1.268 | 2.908 |
| (4)(t12f−t12n)/f | 0.252 | 0.350 | 0.849 |
| (5)(t34f−t34n)/f | 0.325 | 0.276 | 0.292 |
| (6)fG4/f | 2.350 | 2.521 | 2.256 |
| (7)fG1/f | −2.622 | −3.320 | −4.937 |
| (8)fG2/fG3 | −1.278 | −1.255 | −1.387 |
| (9)fG4SUB1/fG4SUB2 | 0.987 | 0.687 | 0.734 |
| (10)fG1Lo/fG1SUB | −7.358 | −6.880 | −4.656 |
| (11)fG1Cp/fG1Cn | −0.800 | −0.607 | −0.822 |
| (12)fGF/fGR | 0.464 | 0.461 | 0.416 |
| (13)Fno | 4.200 | 3.725 | 3.615 |

| Conditional expression | Example4 | Example5 |
|---|---|---|
| (1)fG2/f | 3.913 | 4.334 |
| (2)fG3/f | −3.329 | −2.733 |
| (3)(t12f−t12n)/(t34f−t34n) | 2.139 | 3.032 |
| (4)(t12f−t12n)/f | 0.652 | 0.829 |
| (5)(t34f−t34n)/f | 0.305 | 0.273 |
| (6)fG4/f | 2.254 | 2.236 |
| (7)fG1/f | −4.915 | −4.972 |
| (8)fG2/fG3 | −1.175 | −1.586 |
| (9)fG4SUB1/fG4SUB2 | 0.955 | 0.512 |
| (10)fG1Lo/fG1SUB | −4.244 | −5.008 |
| (11)fG1Cp/fG1Cn | −0.895 | −0.847 |
| (12)fGF/fGR | 0.440 | 0.421 |
| (13)Fno | 3.454 | 3.643 |

The embodiment and various examples of the present invention are described above. However, the present invention is not restricted to these embodiment and examples, and embodiments formed by combining arrangement of these embodiment and examples without departing from the scope of the present invention are also included in the category of the present invention. (Note)

Inventions having the following arrangement are derived from the examples described above.

(Appended Mode 1)

An objective optical system, comprising in order from an object side:

a first lens group having a negative refractive power;
a second lens group having a positive refractive power;
a third lens group having a negative refractive power; and
a fourth lens group having a positive refractive power,
wherein
at a time of focusing from an object point at a long distance to an object point at a short distance, the second lens group moves toward the object side and the third lens group moves toward an image side, and the following conditional expression (1) is satisfied:

$$2 < fG2/f < 8 \qquad (1)$$

where,
fG2 denotes a focal length of the second lens group, and
f denotes a focal length of the overall objective optical system at a time of focusing to an object point at a long distance.

(Appended Mode 2)

The objective optical system according to appended mode 1, wherein the following conditional expression (2) is satisfied:

$$-8 < fG3/f < -2 \qquad (2)$$

where,
fG3 denotes a focal length of the third lens group, and
f denotes the focal length of the overall objective optical system at the time of focusing to an object point at a long distance.

(Appended Mode 3)

The objective optical system according to appended mode 1 or 2, wherein the following conditional expression (3) is satisfied:

$$0.5 < (t12f - t12n)/(t34f - t34n) < 4 \qquad (3)$$

where,
t12f denotes a distance between the first lens group and the second lens group at the time of focusing to an object point at a long distance,
t12n denotes a distance between the first lens group and the second lens group at a time of focusing to an object point at a short distance,
t34f denotes a distance between the third lens group and the fourth lens group at the time of focusing to an object point at a long distance, and
t34n denotes a distance between the third lens group and the fourth lens group at the time of focusing to an object point at a short distance.

(Appended Mode 4)

The objective optical system according to any one of appended modes 1 to 3, wherein the following conditional expression (4) is satisfied:

$$0.2 < (t12f - t12n)/f < 1.2 \qquad (4)$$

where,
t12f denotes the distance between the first lens group and the second lens group at the time of focusing to an object point at a long distance,
t12n denotes the distance between the first lens group and the second lens group at the time of focusing to an object point at a short distance, and
f denotes the focal length of the overall objective optical system at the time of focusing to an object point at a long distance.

(Appended Mode 5)

The objective optical system according to any one of appended modes 1 to 3, wherein the following conditional expression (5) is satisfied:

$$0.2 < (t34f - t34n)/f < 0.5 \qquad (5)$$

where,
t34f denotes the distance between the third lens group and the fourth lens group at the time of focusing to an object point at a long distance,
t34n denotes the distance between the third lens group and the fourth lens group at the time of focusing to an object point at a short distance, and f denotes the focal length of the overall objective optical system at the time of focusing to an object point at a long distance.

(Appended Mode 6)

The objective optical system according to any one of appended modes 1 to 3, wherein the following conditional expression (6) is satisfied:

$$1<fG4/f<3.5 \quad (6)$$

where, fG4 denotes a focal length of the fourth lens group, and f denotes the focal length of the overall objective optical system at the time of focusing to an object point at a long distance.

(Appended Mode 7)

The objective optical system according to any one of appended modes 1 to 3, wherein the following conditional expression (7) is satisfied:

$$-8<fG1/f<-2 \quad (7)$$

where, fG1 denotes a focal length of the first lens group, and f denotes the focal length of the overall objective optical system at the time of focusing to an object point at a long distance.

(Appended Mode 8)

The objective optical system according to any one of appended modes 1 to 3, wherein the following conditional expression (8) is satisfied:

$$-1.8<fG2/fG3<-1 \quad (8)$$

where, fG2 denotes the focal length of the second lens group, and fG3 denotes the focal length of the third lens group.

(Appended Mode 9)

The objective optical system according to any one of appended modes 1 to 3, wherein the fourth lens group includes in order from the object side, at least a first sub lens group and a second sub lens group, the first sub lens group includes a positive lens, the second sub lens group includes a cemented lens of a positive lens and a negative lens, and the following conditional expression (9) is satisfied:

$$0.45<fG4SUB1/fG4SUB2<1.15 \quad (9)$$

where, fG4SUB1 denotes a focal length of the first sub lens group, and fG4SUB2 denotes a focal length of the second sub lens group.

(Appended Mode 10)

The objective optical system according to any one of appended modes 1 to 3, wherein the first lens group includes an object-side lens and a sub lens group having a positive refractive power, the object-side lens is positioned nearest to an object, the sub lens group is positioned on the image side of the object-side lens, and the following conditional expression (10) is satisfied:

$$-8<fG1Lo/fG1SUB<-3.5 \quad (10)$$

where, fG1Lo denotes a focal length of the object-side lens, and fG1SUB denotes a focal length of the sub lens group.

(Appended Mode 11)

The objective optical system according to any one of appended modes 1 to 3, wherein the first lens group includes a cemented lens of a first positive lens and a first negative lens, and the following conditional expression (11) is satisfied:

$$-1.6<fG1Cp/fG1Cn<-0.4 \quad (11)$$

where, fG1Cp denotes a focal length of the first positive lens, and fG1Cn denotes a focal length of the first negative lens.

(Appended Mode 12)

The objective optical system according to any one of appended modes 1 to 3, wherein the objective optical system includes an aperture stop, and the following conditional expression (12) is satisfied $$0.3<fGF/fGR<0.75 \quad (12)$$

where, fGF denotes a focal length of a front group at the time of focusing to an object point at a long distance, and fGR denotes a focal length of a rear group at the time of focusing to an object point at a long distance, and here the front group is a lens group including all lens groups positioned on the object side of the aperture stop, and the rear group is a lens group including all lens groups positioned on an image side of the aperture stop.

(Appended Mode 13)

The objective optical system according to any one of appended modes 1 to 3, wherein the following conditional expression (13) is satisfied $$2.5<Fno<5 \quad (13)$$

where,

Fno denotes an F-number at the time of focusing to an object point at a long distance.

According to the present embodiment, it is possible to provide an objective optical system which is not susceptible to have an effect due to various errors, and which is bright and in which various aberrations are corrected favorably. Moreover, it is possible to provide an image pickup apparatus and an endoscope in which a high-definition image can be acquired.

The present invention is useful for an objective optical system which is not susceptible to have an effect due to various errors, and which is bright and in which various aberrations are corrected favorably. Moreover, it is useful for an image pickup apparatus and an endoscope in which a high-definition image can be acquired.

What is claimed is:

1. An objective optical system consisting of, in order from an object side to an image side:

a first lens group having a negative refractive power, which is stationary all the time;

a second lens group having a positive refractive power;

a third lens group having a negative refractive power, and a fourth lens group having a positive refractive power, which is stationary all the time, wherein at a time of focusing from an object point at a long distance to an object point at a short distance, the second lens group moves toward the object side, and the third lens group moves toward the image side, and the following conditional expressions (1), (5), and (7) are satisfied:

$$2<fG2/f<8 \quad (1)$$

$$0.2<(t34f-t34n)/f<0.5 \quad (5)$$

$$-8<fG1/f<-2 \quad (7)$$

where, fG2 denotes a focal length of the second lens group, f denotes a focal length of the overall objective optical system at a time of focusing to an object point at a long distance, t34f denotes a distance between the third lens group and the fourth lens group at the time of focusing to an object point at a long distance, t34n denotes a distance between the third lens group and the fourth lens group at a time of focusing to an object point at a short distance, and fG1 denotes a focal length of the first lens group.

2. The objective optical system according to claim 1, wherein the following conditional expression (2) is satisfied:

$$-8 < fG3/f < -2 \qquad (2)$$

where, fG3 denotes a focal length of the third lens group, and f denotes the focal length of the overall objective optical system at the time of focusing to an object point at a long distance.

3. The objective optical system according to claim 1, wherein the following conditional expression (3) is satisfied:

$$0.5 < (t12f - t12n)/(t34f - t34n) < 4 \qquad (3)$$

where, t12f denotes a distance between the first lens group and the second lens group at the time of focusing to an object point at a long distance, f12n denotes a distance between the first lens group and the second lens group at the time of focusing to an object point at a short distance, t34f denotes the distance between the third lens group and the fourth lens group at the time of focusing to an object point at a long distance, and t34n denotes the distance between the third lens group and the fourth lens group at the time of focusing to an object point at a short distance.

4. The objective optical system according to claim 1, wherein the following conditional expression (4) is satisfied:

$$0.2 < (t12f - t12n)/f < 1.2 \qquad (4)$$

where, t12f denotes a distance between the first lens group and the second lens group at the time of focusing to an object point at a long distance, t12n denotes a distance between the first lens group and the second lens group at the time of focusing to an object point at a short distance, and f denotes the focal length of the overall objective optical system at the time of focusing to an object point at a long distance.

5. The objective optical system according to claim 1, wherein the following conditional expression (6) is satisfied:

$$1 < fG4/f < 3.5 \qquad (6)$$

where, fG4 denotes a focal length of the fourth lens group, and f denotes the focal length of the overall objective optical system at the time of focusing to an object point at a long distance.

6. The objective optical system according to claim 1, wherein the following conditional expression (8) is satisfied:

$$-1.8 < fG2/fG3 < -1 \qquad (8)$$

where, fG2 denotes the focal length of the second lens group, and fG3 denotes a focal length of the third lens group.

7. The objective optical system according to claim 1, wherein the fourth lens group includes in order from the object side to the image side, at least a first sub lens group and a second sub lens group, the first sub lens group includes a positive lens, the second sub lens group includes a cemented lens of a positive lens and a negative lens, and the following conditional expression (9) is satisfied:

$$0.45 < fG4SUB1/fG4SUB2 < 1.15 \qquad (9)$$

where, fG4SUB1 denotes a focal length of the first sub lens group, and fG4SUB2 denotes a focal length of the second sub lens group.

8. The objective optical system according to claim 1, wherein the first lens group includes an object-side lens and a sub lens group having a positive refractive power, the object-side lens is positioned nearest to object, the sub lens group is positioned on the image side of the object-side lens, and the following conditional expression (10) is satisfied:

$$-8 < fG1Lo/fG1SUB < -3.5 \qquad (10)$$

where, fG1Lo denotes a focal length of the object-side lens, and fG1SUB denotes a focal length of the sub lens group.

9. The objective optical system according to claim 1, wherein the first lens group includes a cemented lens of a first positive lens and a first negative lens, and the following conditional expression (11) is satisfied:

$$-1.6 < fG1Cp/fG1Cn < -0.4 \qquad (11)$$

where, fG1Cp denotes a focal length of the first positive lens, and fG1Cn denotes a focal length of the first negative lens.

10. The objective optical system according to claim 1, wherein the objective optical system includes an aperture stop, and the following conditional expression (12) is satisfied:

$$0.3 < fGF/fGR < 0.75 \qquad (12)$$

where, fGF denotes a focal length of a front group at the time of focusing to an object point at a long distance, and fGR denotes a focal length of a rear group at the time of focusing to an object point at a long distance, and here the front group is a lens group including all lens groups positioned on the object side of the aperture stop, and the rear group is a lens group including all lens groups positioned on an image side of the aperture stop.

11. The objective optical system according to claim 1, wherein the following conditional expression (13) is satisfied:

$$2.5 < Fno < 5 \qquad (13)$$

where,

Fno denotes an F-number at the time of focusing to an object point at a long distance.

12. An image pickup apparatus comprising, an image sensor, and an objective optical system, wherein the objective optical system consisting of, in order from an object side to an image side, a first lens group having a negative refractive power, which is stationary all the time,
a second lens group having a positive refractive power,
a third lens group having a negative refractive power, and
a fourth lens group having a positive refractive power, which is stationary all the time, wherein
at a time of focusing from an object point at a long distance to an object point at a short distance, the second lens group moves toward the object side, and the third lens group moves toward the image side, and
the following conditional expressions (1), (5), and (7) are satisfied:

$$2 < fG2/f < 8 \quad (1)$$

$$0.2 < (t34f - t34n)/f < 0.5 \quad (5)$$

$$-8 < fG1/f < -2 \quad (7)$$

where,
fG2 denotes a focal length of the second lens group,
f denotes a focal length of the overall objective optical system at a time of focusing to an object point at a long distance,
t34f denotes a distance between the third lens group and the fourth lens group at the time of focusing to an object point at a long distance,
t34n denotes a distance between the third lens group and the fourth lens group at a time of focusing to an object point at a short distance, and
fG1 denotes a focal length of the first lens group.

13. The image pickup apparatus according to claim 12, wherein the following conditional expression (4) is satisfied:

$$0.2 < (t12f - t12n)/f < 1.2 \quad (4)$$

where,
t12f denotes a distance between the first lens group and the second lens group at the time of focusing to an object point at a long distance,
t12n denotes a distance between the first lens group and the second lens group at the time of focusing to an object point at a short distance, and
f denotes the focal length of the overall objective optical system at the time of focusing to an object point at a long distance.

14. The image pickup apparatus according to claim 12, wherein the following conditional expression (6) is satisfied:

$$1 < fG4/f < 3.5 \quad (6)$$

where,
fG4 denotes a focal length of the fourth lens group, and
f denotes the focal length of the overall objective optical system at the time of focusing to an object point at a long distance.

15. The image pickup apparatus according to claim 12, wherein the following conditional expression (8) is satisfied:

$$-1.8 < fG2/fG3 < -1 \quad (8)$$

where,
fG2 denotes the focal length of the second lens group, and
fG3 denotes a focal length of the third lens group.

16. An endoscope comprising,
an image sensor, and
an objective optical system, wherein
the objective optical system consisting of, in order from an object side to an image side,
a first lens group having a negative refractive power, which is stationary all the time,
a second lens group having a positive refractive power,
a third lens group having a negative refractive power, and
a fourth lens group having a positive refractive power, which is stationary all the time, wherein
at a time of focusing from an object point at a long distance to an object point at a short distance, the second lens group moves toward the object side, and the third lens group moves toward the image side, and
the following conditional expressions (1), (5), and (7) are satisfied:

$$2 < fG2/f < 8 \quad (1)$$

$$0.2 < (t34f - t34n)/f < 0.5 \quad (5)$$

$$-8 < fG1/f < -2 \quad (7)$$

where,
fG2 denotes a focal length of the second lens group,
f denotes a focal length of the overall objective optical system at a time of focusing to an object point at a long distance,
t34f denotes a distance between the third lens group and the fourth lens group at the time of focusing to an object point at a long distance,
t34n denotes a distance between the third lens group and the fourth lens group at a time of focusing to an object point at a short distance, and
fG1 denotes a focal length of the first lens group.

17. The endoscope according to claim 16, wherein the following conditional expression (4) is satisfied:

$$0.2 < (t12f - t12n)/f < 1.2 \quad (4)$$

where,
t12f denotes a distance between the first lens group and the second lens group at the time of focusing to an object point at a long distance,
t12n denotes a distance between the first lens group and the second lens group at the time of focusing to an object point at a short distance, and
f denotes the focal length of the overall objective optical system at the time of focusing to an object point at a long distance.

18. The endoscope according to claim 16, wherein the following conditional expression (6) is satisfied:

$$1 < fG4/f < 3.5 \quad (6)$$

where,
fG4 denotes a focal length of the fourth lens group, and
f denotes the focal length of the overall objective optical system at the time of focusing to an object point at a long distance.

19. The endoscope according to claim 16, wherein the following conditional expression (8) is satisfied:

$$-1.8 < fG2/fG3 < -1 \quad (8)$$

where,
fG2 denotes the focal length of the second lens group, and
fG3 denotes a focal length of the third lens group.

* * * * *